United States Patent
Lyu et al.

(10) Patent No.: US 11,323,223 B2
(45) Date of Patent: May 3, 2022

(54) SYSTEMS AND METHODS FOR ROBUST TRANSMISSION FOR SEMI-PERSISTENT SCHEDULING AND CONFIGURED GRANT

(71) Applicants: Yongxia Lyu, Ottawa (CA); Aman Jassal, Kanata (CA); Jianglei Ma, Ottawa (CA)

(72) Inventors: Yongxia Lyu, Ottawa (CA); Aman Jassal, Kanata (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/935,633

(22) Filed: Jul. 22, 2020

(65) Prior Publication Data
US 2021/0036822 A1    Feb. 4, 2021

Related U.S. Application Data

(60) Provisional application No. 62/881,211, filed on Jul. 31, 2019.

(51) Int. Cl.
*H04L 5/00* (2006.01)
*H04L 27/26* (2006.01)
*H04W 72/14* (2009.01)

(52) U.S. Cl.
CPC ............ *H04L 5/0048* (2013.01); *H04L 5/006* (2013.01); *H04L 27/2613* (2013.01); *H04W 72/14* (2013.01)

(58) Field of Classification Search
CPC ... H04L 5/0048; H04L 27/2613; H04L 5/006; H04L 27/2601; H04L 5/0035; H04W 72/14; H04W 72/042; H04B 7/0617
See application file for complete search history.

(56) References Cited

U.S. PATENT DOCUMENTS

2019/0254045 A1* 8/2019 Sadiq ................ H04W 72/0446
2021/0243784 A1* 8/2021 Goto ................. H04W 72/1247

FOREIGN PATENT DOCUMENTS

CN     110035502 A    7/2019
WO    2019139361 A1  7/2019

OTHER PUBLICATIONS

"3rd Generation Partnership Project; Technical Specification Group Radio Access Network; NR; Physical layer procedures for control" (Release 15), Technical Specification, 3GPP TS 38.213 V15.6.0, Jun. 2019, 107 pages.

(Continued)

*Primary Examiner* — Jean B Corrielus

(57) ABSTRACT

Aspects of the present application use diversity of more than one TCI state, QCL assumption, precoder and/or SRI on the network side to enable multiple transmission beams in a transmission period having multiple transmission opportunities to provide robust beam transmission from the network side. An example of transmission opportunities in a transmission period may be OFDM symbols in a slot. Aspects of the present application use diversity of more than one TCI state, QCL assumption, precoder and/or SRI at the UE to enable the UE to transmit multiple transmission beams in a configured transmission period having multiple transmission opportunities to provide robust transmission from the UEs. When using multiple transmission beams, in the event that data transmitted on one beam cannot be decoded (e.g. due to beam blockage, poor radio conditions, etc.), data transmitted on other beams can still be decoded successfully.

20 Claims, 18 Drawing Sheets

(56) References Cited

OTHER PUBLICATIONS

"3rd Generation Partnership Project; Technical Specification Group Radio Access Network; Evolved Universal Terrestrial Radio Access (E-UTRA); Physical layer procedures" (Release 13), Technical Specification, 3GPP TS 36.213 V13.0.1, Jan. 2016, 326 pages.
NTT DOCOMO, Inc., Enhanced UL transmission with configured grant for URLLC, 3GPP TSG RAN WG1 Ad-Hoc Meeting 1901, Taipei, Taiwan, Jan. 21-25, 2019, R1-1900974, 13 pages-.
MediaTek Inc., Study and evaluation of configured-grant enhancements for URLLC, 3GPP TSG RAN WG1 Ad-Hoc Meeting 1901, Taipei, Taiwan, Jan. 21-25, 2019, R1-1900213, 8 pages.

\* cited by examiner

| Bit field mapped to index | TCI(s) or TCI stateId |
|---|---|
| 0 | 0 |
| 1 | 1 |
| 2 | 0,1 |
| 3 | Reserved |

FIG. 5A

| Bit field mapped to index | TCI(s) or TCI stateId |
|---|---|
| 0 | 0 |
| 1 | 1 |
| 2 | 2 |
| 3 | 0,1 |
| 4 | 0,2 |
| 5 | 1,2 |
| 6 | 0,1,2 |
| 7 | reserved |

FIG. 5B

| Bit field mapped to index | TCI(s) or TCI stateId |
|---|---|
| 0 | 0 |
| 1 | 1 |
| 2 | 2 |
| 3 | 3 |
| 4 | 0,1 |
| 5 | 0,2 |
| 6 | 1,2 |
| 7 | 0,1,2 |
| 8 | reserved |

FIG. 5C

| Bit field mapped to index | SRI(s), $N_{SRS}=2$ |
|---|---|
| 0 | 0 |
| 1 | 1 |

FIG. 6A

| Bit field mapped to index | SRI(s), $N_{SRS}=3$ |
|---|---|
| 0 | 0 |
| 1 | 1 |
| 2 | 2 |
| 3 | reserved |

FIG. 6B

| Bit field mapped to index | SRI(s), $N_{SRS} = 4$ |
|---|---|
| 0 | 0 |
| 1 | 1 |
| 2 | 2 |
| 3 | 3 |

FIG. 6C

| Bit field mapped to index | SRI(s), $N_{SRS} = 2$ |
|---|---|
| 0 | 0 |
| 1 | 1 |
| 2 | 0,1 |
| 3 | reserved |

FIG. 6D

| Bit field mapped to index | SRI(s), $N_{SRS} = 3$ |
|---|---|
| 0 | 0 |
| 1 | 1 |
| 2 | 2 |
| 3 | 0,1 |
| 4 | 0,2 |
| 5 | 1,2 |
| 6-7 | reserved |

FIG. 6E

| Bit field mapped to index | SRI(s), $N_{SRS} = 4$ |
|---|---|
| 0 | 0 |
| 1 | 1 |
| 2 | 2 |
| 3 | 3 |
| 4 | 0,1 |
| 5 | 0,2 |
| 6 | 0,3 |
| 7 | 1,2 |
| 8 | 1,3 |
| 9 | 2,3 |
| 10-15 | reserved |

FIG. 6F

| Bit field mapped to index | SRI(s), $N_{SRS} = 2$ |
|---|---|
| 0 | 0 |
| 1 | 1 |
| 2 | 0,1 |
| 3 | reserved |

FIG. 6G

| Bit field mapped to index | SRI(s), $N_{SRS} = 3$ |
|---|---|
| 0 | 0 |
| 1 | 1 |
| 2 | 2 |
| 3 | 0,1 |
| 4 | 0,2 |
| 5 | 1,2 |
| 6 | 0,1,2 |
| 7 | reserved |

FIG. 6H

| Bit field mapped to index | SRI(s), $N_{SRS} = 4$ |
|---|---|
| 0 | 0 |
| 1 | 1 |
| 2 | 2 |
| 3 | 3 |
| 4 | 0,1 |
| 5 | 0,2 |
| 6 | 0,3 |
| 7 | 1,2 |
| 8 | 1,3 |
| 9 | 2,3 |
| 10 | 0,1,2 |
| 11 | 0,1,3 |
| 12 | 0,2,3 |
| 13 | 1,2,3 |
| 14-15 | reserved |

FIG. 6I

| Bit field mapped to index | SRI(s), $N_{SRS} = 2$ |
|---|---|
| 0 | 0 |
| 1 | 1 |
| 2 | 0,1 |
| 3 | reserved |

FIG. 6J

| Bit field mapped to index | SRI(s), $N_{SRS}=3$ |
|---|---|
| 0 | 0 |
| 1 | 1 |
| 2 | 2 |
| 3 | 0,1 |
| 4 | 0,2 |
| 5 | 1,2 |
| 6 | 0,1,2 |
| 7 | reserved |

FIG. 6K

| Bit field mapped to index | SRI(s), $N_{SRS}=4$ |
|---|---|
| 0 | 0 |
| 1 | 1 |
| 2 | 2 |
| 3 | 3 |
| 4 | 0,1 |
| 5 | 0,2 |
| 6 | 0,3 |
| 7 | 1,2 |
| 8 | 1,3 |
| 9 | 2,3 |
| 10 | 0,1,2 |
| 11 | 0,1,3 |
| 12 | 0,2,3 |
| 13 | 1,2,3 |
| 14 | 0,1,2,3 |
| 15 | reserved |

FIG. 6L

| TCI Codebook entry | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| Corresponding active TCI state for PDSCH | 1st active TCI state | 2nd active TCI state | 3rd active TCI state | 4th active TCI state | 5th active TCI state | 6th active TCI state | 7th active TCI state | 8th active TCI state | 1st + 2nd active TCI states | 1st + 3rd active TCI states | 1st + 4th active TCI states | 1st + 5th active TCI states | 1st + 6th active TCI states | 1st + 7th active TCI states | 1st + 8th active TCI states | Not used |

FIG. 9

SYSTEMS AND METHODS FOR ROBUST TRANSMISSION FOR SEMI-PERSISTENT SCHEDULING AND CONFIGURED GRANT

RELATED APPLICATIONS

This application claims the benefit of priority of U.S. Provisional Patent Application 62/881,211 filed on Jul. 31, 2019, which is hereby incorporated by reference in its entirety.

TECHNICAL FIELD

The present disclosure relates generally to wireless communications, and in particular embodiments, to semi-persistent scheduling (SPS) and configured grant.

BACKGROUND

In some wireless communication systems, user equipments (UEs) wirelessly communicate with a base station to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

When using a configured grant (CG) transmission, UEs are configured with a time/frequency transmission resource that they can use without specifically requesting use of the resource and without specifically being granted the resources by the base station in response to the request. One advantage of CG transmissions is low latency resulting from not having to request and receive a dynamic grant for an allocated time slot from the base station. Furthermore, in a CG transmission, the scheduling overhead may be reduced.

When using a semi-persistent scheduling (SPS) transmission, a time/frequency transmission resource can be configured for use for uplink or downlink. A downlink control information (DCI) can then be used to activate or deactivate the configured resource for downlink or uplink.

The 5G or New Radio (NR) standard is proposing the utilization of frequency bands in multiple frequency ranges. A first frequency range, FR1, is generally considered to cover a range from 410 MHz to 7125 MHz. A second frequency range, FR2, is generally considered to cover a range from 24.25 GHz to 52.6 GHz. Frequency bands in FR2 are in the millimeter wave band and typically have a shorter range than frequency bands in FR1, but FR2 bands have larger bandwidths than the bands in FR1.

Many applications and services have reliability (and/or latency) requirements. For example, ultra-reliable low latency communication (URLLC) services for high reliability generally need to achieve a successful rate of 99.9999% and a latency of one or a few milliseconds. In some URLLC use cases, for example indoor or regional deployments and with high data rate and tight latency boundary, it can be difficult to simultaneously meet requirements of high data rate and low latency when using only FR1 bands. Characteristics such as larger bandwidth, larger subcarrier spacing (SCS) and shorter symbol length, which can occur in FR2 bands as compared to FR1, are suitable for URLLC use cases with high data rate and low latency.

However, a potential issue pertaining to the shorter wavelengths in FR2 is a lack of robustness that can result from beam blocking. Beam blocking can result in beam failure which impacts reliability and introduces additional latency. Therefore, mechanisms that can help in providing robust beam transmission for on FR2 bands would be beneficial for communication systems.

SUMMARY

According to a first aspect of the application, there is provided a method involving configuring transmission beam parameter for configured grant (CG) or semi-persistent scheduling (SPS) transmissions on at least one of a plurality of transmission opportunities in a transmission period. The method also involves transmitting a first repetition of a CG or SPS transmission on a first transmission opportunity of the plurality of transmission opportunities based upon the transmission beam parameter configured for the first transmission opportunity and transmitting a second repetition of the CG or SPS transmission on a second transmission opportunity of the plurality of transmission opportunities based upon the transmission beam parameter for the second transmission opportunity.

In some embodiments, the transmission beam parameters are one or more of: a transmission configuration indication (TCI) state; a sounding resource signal (SRS) resource indicator (SRI); a quasi-co-location (QCL) assumption; a precoder; and a beam index defining a transmission beam.

In some embodiments, when a number of transmission beam parameters being configured is less than a number of transmission opportunities in a transmission period, applying the transmission beam parameters to transmission opportunities in an order based upon the configuration information and then repeating the transmission beam parameters in a same order for the remaining transmission opportunities.

In some embodiments, when a number of transmission beam parameters being configured is more than a number of transmission opportunities in a transmission period, applying the transmission beam parameters to transmission opportunities in a same order based on the configuration information for each of the transmission opportunities.

In some embodiments, the method is performed by a user equipment (UE), and configuring transmission beam parameters includes the UE receiving configuration information for configuring transmission beam parameters for CG or SPS transmissions on at least one of the plurality of transmission opportunities in a transmission period.

In some embodiments, the configuration information includes a single SRS resource indicator (SRI) field including one or more SRIs, each SRI for a transmission opportunity in the transmission period.

In some embodiments, the configuration information includes a plurality of SRI fields, each SRI field including an SRI for a transmission opportunity in the transmission period.

In some embodiments, the configuration information includes SRI information defined by a field of bits, the value of the field of bits corresponding to an index associated with one selection of a set of possible SRI selections.

In some embodiments, at least one of the set of possible SRI selections includes more than one SRI value, each SRI value being for a different layer of the configured grant transmission.

In some embodiments, the configuration information includes an association of one or more demodulation reference signal (DMRS) ports per SRI.

In some embodiments, configuring transmission parameters further includes the UE receiving a downlink control information (DCI) message for activating a particular transmission beam parameter on a particular transmission opportunity.

In some embodiments, transmitting the first repetition of the CG or SPS transmission on the first transmission opportunity involves the UE transmitting the CG or SPS transmission on a physical uplink shared channel (PUSCH) on the first transmission opportunity based upon the transmission beam parameter configured for the first transmission opportunity and transmitting the second repetition of the CG or SPS transmission on the second transmission opportunity involves the UE transmitting the CG or SPS transmission on a PUSCH on the second transmission opportunity based upon the transmission beam parameter configured for the second transmission opportunity.

In some embodiments, the method further involves selecting one or more beams to use for transmitting the CG or SPS transmissions to the base station based on received downlink reference signals received by the UE.

In some embodiments, the method further involves applying a known pattern or other rule to determine configurations for transmission opportunities subsequent to the first transmission opportunity.

In some embodiments, the method is performed by a base station, and configuring transmission beam parameters includes the base station transmitting configuration information to notify a user equipment (UE) regarding the configuration information used by the base station to configure transmission beam parameters for CG or SPS transmissions from the base station to the UE on at least one of the plurality of transmission opportunities in a transmission period.

In some embodiments, the configuring transmission parameters further includes the base station transmitting a downlink control information (DCI) message for notifying the UE of a particular transmission beam parameter being used on a particular transmission opportunity.

In some embodiments, the configuration information includes a single transmission configuration indication (TCI) state field including one or more TCI states, each TCI state for a transmission opportunity in the transmission period.

In some embodiments, the configuration information includes a plurality of TCI state fields, each TCI state field including a TCI state for a transmission opportunity in the transmission period.

In some embodiments, the configuration information includes TCI state information defined by a field of bits, the value of the field of bits corresponding to an index associated with one selection of a set of possible TCI state selections.

In some embodiments, at least one of the set of possible TCI state selections includes more than one TCI state value, each TCI state value of the more than one TCI state value being associated with a different transmission opportunity in the transmission period.

In some embodiments, the configuration information includes a media access control (MAC) control element (CE) that activates one or more TCI state.

In some embodiments, the configuration information includes a set of quasi-co-location (QCL) assumptions, each QCL assumption related to a particular downlink reference signal (DL RS).

In some embodiments, the configuration information further includes TCI state information that indicates which DL RS the SPS transmission is QCL-ed with.

In some embodiments, the configuration information includes an association of one or more demodulation reference signal (DMRS) ports per TCI state.

In some embodiments, transmitting the first repetition of the CG or SPS transmission on the first transmission opportunity involves transmitting the configured grant transmission on a physical downlink shared channel (PDSCH) on the first transmission opportunity based upon the transmission beam parameter configured for the first transmission opportunity and transmitting the second repetition of the CG or SPS transmission on the second transmission opportunity involves transmitting the configured grant transmission on a PDSCH on the second transmission opportunity based upon the transmission beam parameter configured for the second transmission opportunity.

In some embodiments, the method further involves the base station receiving a beam status indicator (BSI) indicating a status of a beam transmitted by the base station for a given UE receive beam.

According to a second aspect of the application, there is provided a method involving configuring transmission beam parameters for configured grant (CG) or semi-persistent scheduling (SPS) transmissions on at least one of a plurality of transmission opportunities in a transmission period. The method also involves receiving a first repetition of a CG or SPS transmission on a first transmission opportunity of the plurality of transmission opportunities based upon the transmission beam parameter configured for the first transmission opportunity and receiving a second repetition of the CG or SPS transmission on a second transmission opportunity of the plurality of transmission opportunities based upon the transmission beam parameter for the second transmission opportunity.

In some embodiments, the transmission beam parameters are one or more of: a transmission configuration indication (TCI) state; a sounding resource signal (SRS) resource indicator (SRI); a quasi-co-location (QCL) assumption; a precoder; and a beam index defining a transmission beam.

In some embodiments, when a number of transmission beam parameters being configured is less than a number of transmission opportunities in a transmission period, applying the transmission beam parameters to transmission opportunities in an order based upon the configuration information and then repeating the transmission beam parameters in a same order for the remaining transmission opportunities.

In some embodiments, when a number of transmission beam parameters being configured is more than a number of transmission opportunities in a transmission period, applying the transmission beam parameters to transmission opportunities in a same order based on the configuration information for each of the transmission opportunities.

In some embodiments, the method is performed by a user equipment (UE), and configuring transmission beam parameters involves the UE receiving configuration information for configuring transmission beam parameters for configured grant transmissions to be received on at least one of the plurality of transmission opportunities in a transmission period.

In some embodiments, the configuration information includes a single transmission configuration indication (TCI) state field including one or more TCI states, each TCI state for a transmission opportunity in the transmission period.

In some embodiments, the configuration information includes a plurality of TCI state fields, each TCI state field including a TCI state for a transmission opportunity in the transmission period.

In some embodiments, the configuration information includes TCI state information defined by a field of bits, the value of the field of bits corresponding to an index associated with one selection of a set of possible TCI state selections.

In some embodiments, at least one of the set of possible TCI state selections includes more than one TCI state value, each TCI state value of the more than one TCI state value being associated with a different transmission opportunity in the transmission period.

In some embodiments, the configuration information includes a media access control (MAC) control element (CE) that activates one or more TCI state.

In some embodiments, the configuration information includes an association of one or more demodulation reference signal (DMRS) ports per TCI state.

In some embodiments, configuring transmission beam parameters further includes the UE receiving a downlink control information (DCI) message for activating a particular transmission beam parameter on a particular transmission opportunity.

In some embodiments, receiving the first repetition of the CG or SPS transmission on the first transmission opportunity involves the UE receiving the CG or SPS transmission on a physical downlink shared channel (PDSCH) on the first transmission opportunity based upon the transmission beam parameter configured for the first transmission opportunity and receiving the second repetition of the CG or SPS transmission on the second transmission opportunity involves the UE receiving the CG or SPS transmission on a PDSCH on the second transmission opportunity based upon the transmission beam parameter configured for the second transmission opportunity.

In some embodiments, the method further involves the UE transmitting a beam status indicator (BSI) indicating a status of a beam transmitted by a base station for a given UE receive beam.

In some embodiments, the method is performed by a base station, and the configuring transmission beam parameters involves the base station transmitting configuration information to notify a user equipment (UE) regarding the configuration information used by the base station to configure transmission beam parameters for CG or SPS transmissions from the base station to the UE on at least one of the plurality of transmission opportunities in a transmission period.

In some embodiments, configuring transmission parameters further involves the base station transmitting a downlink control information (DCI) message for notifying the UE of a particular transmission beam parameter being used on a particular transmission opportunity.

In some embodiments, the configuration information includes a single resource indicator (SRI) field including a set of multiple SRIs, each SRI for a transmission opportunity in the transmission period.

In some embodiments, the configuration information includes a plurality of SRI fields, each SRI field including an SRI for a transmission opportunity in the transmission period.

In some embodiments, the configuration information includes SRI information defined by a field of bits, the value of the field of bits corresponding to an index associated with one selection of a set of possible SRI selections.

In some embodiments, at least one of the set of possible SRI selections includes more than one SRI value, each SRI value being for a different layer of the CG transmission.

In some embodiments, the configuration information includes an association of one or more demodulation reference signal (DMRS) ports per SRI.

In some embodiments, receiving the first repetition of the configured grant transmission on the first transmission opportunity involves the base station receiving the configured CG or SPS on a physical uplink shared channel (PUSCH) on the first transmission opportunity based upon the transmission beam parameter configured for the first transmission opportunity and receiving the second repetition of the configured grant transmission on the second transmission opportunity involves receiving the CG or SPS transmission on a PUSCH on the second transmission opportunity based upon the transmission beam parameter configured for the second transmission opportunity.

In some embodiments, the method further involving, based on the received first and second repetitions, determining one or more beams to use for transmitting transmissions to the UE.

According to a third aspect of the application, there is provided a UE including a processor and a computer-readable medium having stored thereon computer-executable instructions. The computer-executable instructions, when executed by the processor, cause the UE to perform methods described above pertaining to operation of a UE.

According to a fourth aspect of the application, there is provided a base station including a processor and a computer-readable medium having stored thereon computer-executable instructions. The computer-executable instructions, when executed by the processor, cause the base station to perform methods described above pertaining to operation of a base station.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIGS. 5A, 5B, and 5C are examples of three different arrangements of indices mapped to TCI state identifiers according to embodiments of the present disclosure.

FIG. 6A to 6L are examples of different arrangements of indices mapped to SRI according to embodiments of the present disclosure.

FIG. 9 is an example of a mapping of TCI codebook entries to corresponding active TCI state for PDSCH according to an embodiment of the present disclosure.

DETAILED DESCRIPTION OF ILLUSTRATIVE EMBODIMENTS

Figure 1:
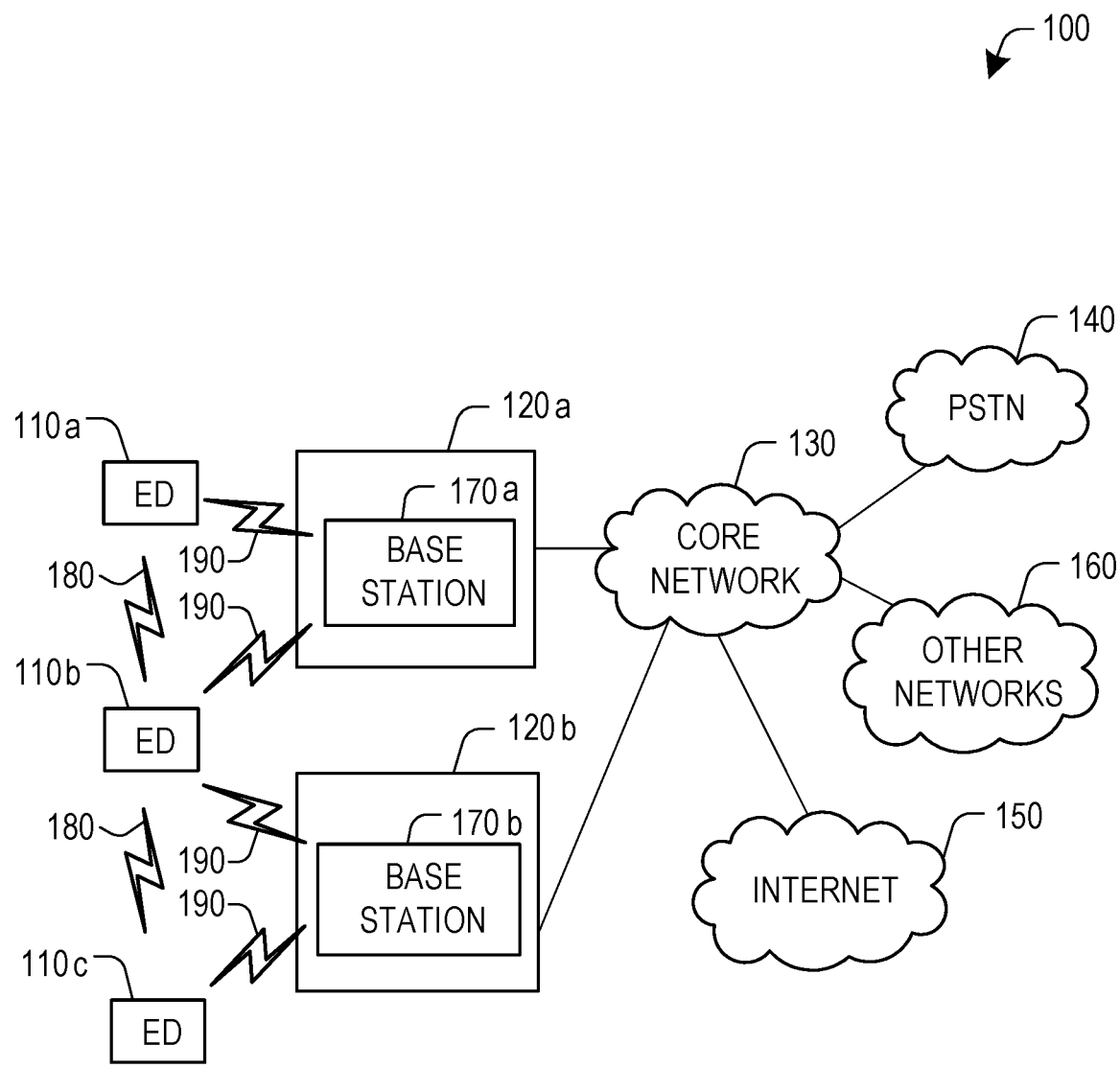
FIG. 1 is a schematic diagram of a communication system in which embodiments of the disclosure may occur.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

For URLLC high reliability cases, transmission latency may be limited to short time periods, for example as low as one or a few milliseconds. When using FR2, if beam blocking occurs, the UE has to then go through a beam forming recovery (BFR) process to pick a new serving beam before communication is re-established, which can take hundreds of milliseconds. This would clearly be unacceptable in a URLLC high reliability low latency scenario.

For downlink transmissions, in Release 15 (R15) and Release16 (R16) of the NR standard specification, a UE can be configured with a list of up to M transmission configuration indication state (TCI-State) configurations as part of higher layer "PDSCH-Config" information element (IE). In some instances, one or more of the M TCI states can be activated by a Medium Access Control (MAC) control Element (CE) message. When multiple TCI states are activated by the MAC CE, a downlink control information (DCI) in a physical downlink control channel (PDCCH) indicates one TCI state from multiple activated TCI states and the UE uses the indicated TCI state to decode a transmission in a physical downlink shared channel (PDSCH). The value M may depend on the UE capability. In some instances the capability of the UE hardware may be in part represented by a parameter "maxNumberActiveTCI-PerBWP".

Each TCI-State configuration includes various parameters for configuring a quasi co-location (QCL) relationship between one or two downlink reference signals (DL RS) and demodulation reference signal (DM-RS) ports of the PDSCH. The QCL relationship is configured by a higher layer parameter. Examples of such a higher layer parameter are "qcl-Type1" for a first DL RS and "qcl-Type2" for a second DL RS, if a second DL RS is configured. For a situation in which two DL RSs are configured, QCL types may be different, regardless of whether the reference signals are allocated to the same DL RSs or different DL RSs.

The QCL types corresponding to each DL RS may be configured by a higher layer parameter such as "qcl-Type" in "QCL-Info". The QCL type helps to define different properties of the channel condition that a transmission traverses. Examples of QCL types may take one of the following values, in which particular properties of the channel are indicated in brackets after the individual types, 1) 'QCL-TypeA': {Doppler shift, Doppler spread, average delay, delay spread}, 2) 'QCL-TypeB': {Doppler shift, Doppler spread}, 3) 'QCL-TypeC': {Doppler shift, average delay} and 4) 'QCL-TypeD': {Spatial Rx parameter}.

The UE receives an activation command used to map one or more TCI states to code points of a DCI field "Transmission Configuration Indication". When a hybrid automatic repeat request acknowledgement (HARQ-ACK) corresponding to the PDSCH carrying the activation command is transmitted in a slot n, an indicated mapping between TCI states and code points of the DCI field "Transmission Configuration Indication" can be applied starting as of the slot n. In R15 and R16, when the UE is configured with a PDSCH having multiple slots, the indicated TCI state is based on activated TCI states in a first slot with the scheduled PDSCH. The TCI state is the same across the slots for the scheduled PDSCH. In other words, a TCI in a DCI message only indicates one code point, which is one TCI state, for a current data transmission, even when there are multiple repetitions.

For UL transmissions, the UE can perform a one-to-one mapping based on indicated semi-persistent signaling (SPS) resource indicators (SRIs) to indicate DM-RS ports and corresponding physical uplink shared channel (PUSCH) layers {0 . . . v-1} configured by DCI format 0_1 or by a "ConfiguredGrantConfig"IE, in a corresponding order to the provided SRIs.

There is currently no proposed mechanism for configured grant or SRS transmissions in DL or UL for data repetition utilizing different beams, different TCI states, different QCL assumptions, different precoders and/or different SRI in a same transmission period. An example of a transmission period is a slot including a set of orthogonal frequency division multiplexed (OFDM) symbols.

Aspects of the present application use diversity of more than one TCI state, QCL assumption, precoder and/or SRI on the network side to enable multiple transmission beams in a transmission period having multiple transmission opportunities to provide robust beam transmission from the network side. An example of transmission opportunities in a transmission period may be OFDM symbols in a slot. Aspects of the present application use diversity of more than one TCI state, QCL assumption, precoder and/or SRI at the UE to enable the UE to transmit multiple transmission beams in a configured transmission period having multiple transmission opportunities to provide robust transmission from the UEs.

Figure 2A:
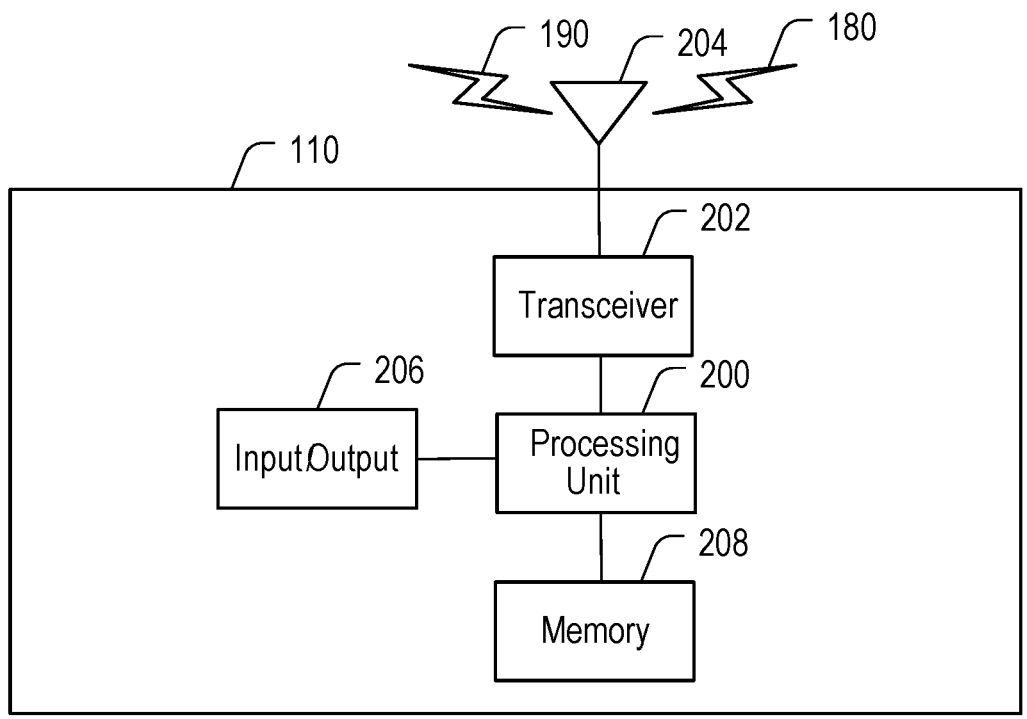
FIGS. 2A and 2B are block diagrams of an example user equipment and base station, respectively.
Figure 2B:
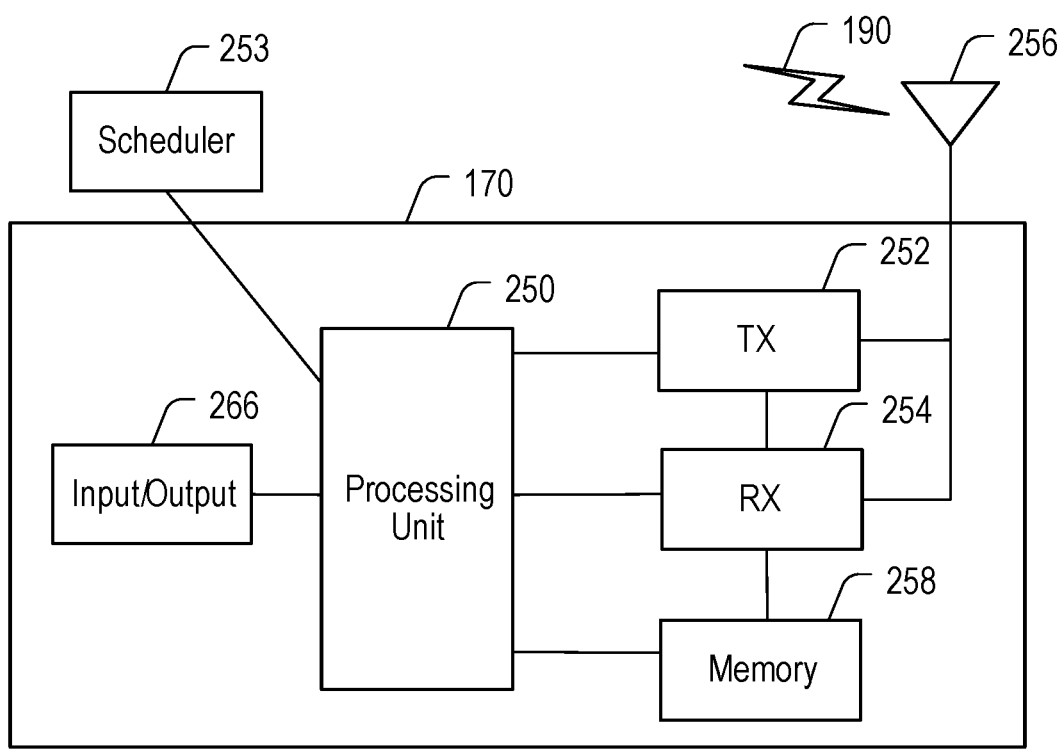

FIGS. 1, 2A, and 2B provide context for the network and device that may be in the network and that may implement aspects of the present disclosure.

FIG. 1 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. Although certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more SL air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In this disclosure, the SL transmissions between cooperating UEs may be "grant-free" transmissions or as a mode for data transmissions that are performed without communicating dynamic scheduling. Grant-free transmissions are sometimes called "configured grant", "grant-less", "schedule free", or "schedule-less" transmissions. Grant-free SL transmissions can also be referred to as SL "transmission without grant", "transmission without dynamic grant", "transmission without dynamic scheduling", or "transmission using configured grant", for example.

A configured grant transmission typically requires the receiver to know the parameters and resources used by the transmitter for the transmission. However, in the context of SL transmissions, the receiving UE is typically not aware of the transmitting UE's configuration parameters, such as which UE is transmitting, the ultimate target of the data (e.g., another UE), the time-domain and frequency-domain communication resources used for the transmission, and other control information. Various methods may be used to provide the configuration parameters and control information necessary for enabling configured grant transmissions in SL. The various methods will, however, each incur a respective overhead penalty. Embodiments of the present disclosure comprise including at least some of those configuration parameters and/or control information in the SL configured grant transmission, which may provide performance and/or overhead benefits.

In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

FIGS. 2A and 2B illustrate example devices that may implement the methods and teachings according to this disclosure. In particular, FIG. 2A illustrates an example ED 110, and FIG. 2B illustrates an example base station 170. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the UEs 110 and the base stations 170 are known to those of skill in the art. As such, these details are omitted here for clarity. CONFIGURED GRANT AND SEMI-PERSISTENT SCHEDULING TRANSMISSIONS The base stations 170 are configured to support wireless communication with EDs 110, which may each send configured grant (CG) or semi-persistent scheduling (SPS) uplink transmissions, and may each receive semi-persistent scheduling (SPS) downlink transmissions. Uplink transmissions from the EDs 110 are performed on a set of time-frequency resources. Downlink transmissions from the BSs 170 are performed on a set of time-frequency resources. A CG or SPS uplink transmission is an uplink transmission that is sent using uplink resources without the base stations 170 dynamically allocating resources to request/grant mechanisms. SPS downlink transmission is a downlink transmission that is sent using downlink resources without the base stations 170 dynamically signaling the resources to the UEs. By performing CG or SPS transmissions, total network overhead resources may be saved. Furthermore, time savings may be provided by bypassing the dynamic request/grant procedure/resource allocation. An ED sending a CG uplink transmission, or configured to send a CG uplink transmission, may be referred to as operating in configured grant mode. Configured grant uplink transmissions are sometimes called "grant-free", "grant-less", "schedule free", or "schedule-less" transmissions. Configured grant uplink transmissions from different EDs may be transmitted using shared designated resource units, in which case the configured grant uplink transmissions are contention-based transmissions. One or more base stations 170 may perform blind detection of the configured grant uplink transmissions. SPS downlink transmissions from BS(s) may be transmitted using shared designated resource units.

The above paragraph refers to performance of a base station and an ED. However, communication can occur between two EDs, for example 110a and 110b, in a sidelink communication 180, in which one of the EDs substantially operates in the same manner as the base station is described to operate.

In a wireless network according to an embodiment, any ED can be configured for grant-based, CG, or SPS transmissions depending on, e.g., the application and device types and requirements. Usually, a CG or SPS transmission may require resource (pre-) configuration by RRC signaling and have resource reconfiguration or an update during operation. In some embodiments, the CG or SPS resources can be configured for EDs by UE-specific signaling, or broadcast or multi-cast signaling in some scenarios. Two or more CG or SPS transmissions can share the same configured resources. Furthermore, in some embodiments, a grant-based transmission can use dedicated resources or can share resources (fully or partially) with CG or SPS resources in a time interval. Here, SPS transmission can refer to SPS downlink transmission and SPS uplink transmission if not specifically indicated.

Any of the CG, SPS and grant-based transmissions can be used for any application traffic or services type, depending on the associated application requirements and quality of service (QoS). By way of a non-limiting example, CG or SPS transmissions can be used for: ultra-reliable low latency communication (URLLC) traffic to satisfy the low latency requirement; enhanced mobile broadband (eMBB) traffic with short packets to save signaling overhead; and eMBB traffic to dynamically take advantage of link adaptation and enhance resource utilization and spectrum efficiency. Aspects of the present application may mitigate excess latency.

One ED or a group of EDs may have a group ID or Radio Network Temporary ID (RNTI), e.g., configured grant (CG)-RNTI or grant-based (GB) RNTI, to share the same parameter or resource configuration. The group ID can be pre-configured, or dynamically configured to each ED. The parameter or resource configuration to the ED(s) with the group ID can be done by semi-static or dynamic signaling. Semi-static signaling is typically less frequent than dynamic signaling, and utilizes radio resource control (RRC) messages. Dynamic signaling is more typically frequent that semi-static signaling, and utilizes downlink control information (DCI) sent in a physical downlink control channel (PDCCH). In some embodiments, the group ID can be used for, e.g., resource deactivation or activation for the EDs in the group. In some embodiments, for New Radio Configured Grant (NR CG) and Further Enhanced Licensed-Assisted Access (FeLAA) autonomous uplink (AUL), activation and deactivation can be performed through UE-specific downlink control information (DCI), By way of a non-limiting example, the resources being activated or deactivated can include frequency, time, and reference signal (RS) associated with each ED in the group.

CG and SPS transmissions reduce the latency and control overhead associated with the scheduling request/grant procedure of grant-based transmission and can allow for more transmission repetitions to increase the likelihood of successful detection or achieve a desired reliability.

Configured Grant Resource Structure

To support configured grant transmissions in NR licensed band or NR unlicensed band, the associated resources configured for an ED or a group of EDs can include any or all of the following:

1) Frequency resources. In one example, a physical resource block (PRB) scheme is provided. The PRB scheme indicates physical starting frequency resource block (RB) and allocation size, i.e., number of the RBs allocated.

2) Time resources, including starting/ending position of one data transmission time interval. For example, transmission time interval (TTI) can be one symbol, mini-slot, or slot.

3) Reference signal (RS) or RS configuration, where each ED can be configured with one or more reference signals (RSs) e.g. demodulation reference signals (DMRSs) depending on scenarios involved. For a group of EDs, each ED may or may not have a different RS or have a different set of RSs. Note that different RSs can be orthogonal or non-orthogonal to each other depending on an application, e.g., such as URLLC application or massive machine-type communication (mMTC) application.

4) ED/ED group specific hopping parameters, which may include one of the following two parameters. One parameter may include a hopping pattern cycle period. In one embodiment, an absolute reference duration (e.g., 20 TTI before repeating itself) is defined. During the absolute reference duration, the number of hopping steps (e.g., 10 times) to take before repeating the hopping pattern again can be determined based on periodicity of time interval resource accessible for configured grant transmissions (e.g., 2 TTI). In another embodiment, an absolute number of hopping times can be defined, for example hopping 20 times before repeating itself. Other parameters may include a hopping pattern index or indices, where one ED may have one or more hopping pattern indices.

5) One or more hybrid automatic repeat request (HARQ) process IDs per ED.

6) One or more modulation and coding schemes (MCSs) per ED, where a configured grant ED can indicate explicitly or implicitly which MCS to use for a transmission.

7) Number of configured grant transmission repetitions K, one or more K values can be configured for an ED, where which K value to use depends on certain rule taking into account ED channel conditions, service types, etc.

8) Power control parameters, including power ramping step size (e.g., for an ED).

9) Other parameters, including information associated with general grant-based data and control transmissions. Note that sometimes, a subset of configured grant resources can be referred to as "fixed" or "reserved" resources; whereas a subset of grant-based resources can be referred to as "flexible" resources, which can be dynamically scheduled by a base station.

Hybrid Automatic Repeat Request

As discussed above, the ED 110 may be configured to use a particular set of resources for configured grant transmission. A collision may occur when two or more of the EDs 110 attempt to transmit data on a same set of uplink resources. To mitigate possible collisions, the EDs 110 may use repetitions. A repetition, without grant, of an original CG or SPS uplink transmission is referred to herein generally as "configured grant repetitions". Any discussion of a CG or SPS repetition herein should be understood to refer to either a first repetition (i.e., initial transmission) or a subsequent repetition. Herein, the term "repetitions" includes both simple repetitions of the transmitted data, as well as repetitions using an asynchronous hybrid automatic repeat request (HARQ), that is, a combination of high-rate forward error-correcting coding and physical layer automatic repeat request (ARQ) error control.

In NR licensed band and unlicensed band, a number of automatic configured grant repetitions may be configured in semi static way (indicated in RRC signaling) or dynamical way (indicated in DCI), to improve reliability and mitigate the latency associated with waiting for an acknowledgement (ACK) or a negative acknowledgement (NACK) message. The repetitions may be performed by the ED 110 until at least one of the following conditions is met:

(1) An ACK message is received from the base station 170 indicating that the base station 170 has successfully received and decoded the TB. The ACK may be sent in a dedicated downlink acknowledgement channel, sent as individual Downlink Control Information (DCI), sent in a data channel, sent as part of a group ACK/NACK, etc.

(2) The number of repetitions reaches K. In other words, if the ED 110 has performed K repetitions and an ACK is still not received from the base station 170, then the ED 110 gives up trying to send the data to the base station 170. In some embodiments, K is semi-statically configured by the base station 170, such that the base station 170 or the network can adjust K over time.

(3) A grant is received from the base station 170 performing a configured grant to grant-based switch.

In an embodiment, the configured grant repetitions may be triggered by receiving a negative acknowledgment (NACK) message, or failing to receive an acknowledgment (ACK) message, e.g., before a timer expires. In an alternative embodiment, K configured grant repetitions are performed irrespective of the response from the base station 170.

The resources over which the one or more configured grant repetitions are performed may be pre-configured, in which case the base station determines the resources based on a priori information. Alternatively, the resources over which the configured grant repetitions are performed may be determined e.g. according to an identifier in a pilot signal of the original configured grant uplink transmission. This may allow the base station to predict, or otherwise identify, which uplink resources will carry the one or more repetitions upon detecting the identifier in the pilot symbol.

Configured grant transmission reduces latency and control overhead associated with grant-based procedures, and can allow for more retransmissions/repetitions to increase reliability. However, due to the lack of uplink scheduling and grant signaling, configured grant EDs may have to be pre-configured to use a fixed modulation and coding scheme (MCS) level at least for initial configured grant transmission. In one embodiment, configured grant EDs are configured to use the most reliable MCS level for a given resource unit for configured grant uplink transmissions.

One type of transmission with configured grant (TCG) that is being contemplated for NR, referred to as Type 1 NR TCG, includes using radio resource control (RRC) signaling to provide configuration information to an ED. Examples of configuration information include, but are not limited to, periodicity, offset, time-frequency allocation, ED-specific demodulation reference signals (DMRS) configuration, modulation coding scheme/transmit block size (MCS/TBS), number of repetitions (K) and power control.

In a second type, referred to as Type 2 NR TCG, RRC signaling can be used to provide some of the configuration information to an ED, and other configuration information is provided to the ED in activation downlink control information (DCI). Examples of the configuration information that might be provided in RRC signaling include, but are not limited to, periodicity, power control, number of repetitions (K), and MCS/TBS. Examples of configuration information that may be provided in the activation DCI include, but are not limited to, offset, time-frequency allocation, MCS/TBS and ED-specific DMRS configuration information.

With regard to time-domain resource allocation for the configured grant transmission in unlicensed spectrum, the following two parameters are configured through RRC signalling for both Type1 and Type 2 identified above.

K-repetitions: K={1, 2, 4, 8} consecutive transmissions of the same PUSCH.

Periodicity: The following periodicities are supported depending on the configured subcarrier spacing:

15 kHz: 2, 7, n*14, where n={1, 2, 4, 5, 8, 10, 16, 20, 32, 40, 64, 80, 128, 160, 320, 640};

30 kHz: 2, 7, n*14, where n={1, 2, 4, 5, 8, 10, 16, 20, 32, 40, 64, 80, 128, 160, 256, 320, 640, 1280};

60 kHz with normal cyclic prefix (CP): 2, 7, n*14, where n={1, 2, 4, 5, 8, 10, 16, 20, 32, 40, 64, 80, 128, 160, 256, 320, 512, 640, 1280, 2560}; and 60 kHz with extended cyclic prefix (ECP): 2, 6, n*12, where n={1, 2, 4, 5, 8, 10, 16, 20, 32, 40, 64, 80, 128, 160, 256, 320, 512, 640, 1280, 2560}.

The following two parameters are configured via RRC for Type 1 and via activation DCI for Type 2:

timeDomainAllocation: Allocation of configured uplink grant in time domain which indicates a table entry containing startSymbolAndLength; and timeDomainOffset: Offset of a resource with respect to SFN=0 in time domain in case of Type 1 and with respect to the slot in which the activation DCI was transmitted in case of Type 2.

In some embodiments, robust beam transmission may be provided by transmitting data on more than one beam while supporting data repetitions associated with different transmission configuration indication (TCI)/quasi co-location (QCL) assumptions/precoder/beams. When using multiple beams, in the event that data transmitted on one beam cannot be decoded (e.g. due to beam blockage, poor radio conditions, etc.), data transmitted on other beams can still be decoded successfully.

For Downlink (DL) Transmission

For a DL direction CG transmission or SPS transmission that is to occur from a base station to a first UE, the first UE receives configuration information from the base station. Alternatively, this method can be used for sidelink communication, in which case the first UE receives configuration information from a second UE, which would perform all of the functions of the base station described below. This information notifies the first UE of relevant information the first UE should know to be able to receive and decode the DL CG or SPS transmission. The configuration information includes more than one transmission beam parameter, for example QCL assumptions, TCI states, precoders, or beam information, such as for example a beam index that may be used to identify a transmission beam. In some embodiments, the transmission beam parameter information may be associated with one transmission opportunity (TO) of all of the TOs in a transmission period. The transmission beam parameter information might only indicate transmission beam parameter for the one TO, and the UE would apply a known pattern, or other rule, to determine configurations for subsequent TOs in the same transmission period, or for TOs in other transmission periods. In some embodiments, the transmission beam parameters may be associated with more than one transmission opportunity (TO) of all of the TOs in a transmission period.

TOs in the transmission period are resources configured within the transmission period to be used for the CG or SPS. As described above, a transmission period may be a slot having multiple OFDM symbols. If the slot has 14 OFDM symbols, one or several of the OFDM symbols may be configured as a TO. For example, the third, fifth and ninth OFDM symbols in a slot may be configured as TOs of the entire slot.

Once the UE is configured, the UE receives the DL CG or SPS transmission on a PDSCH on the TOs using the associated QCL assumptions, TCI states, precoders, or beams according to the signaling from base station, or the other UE.

DCI activation is also referred to as DCI for scheduling activation PDCCH validation in NR Rel-15 and Rel-16 specification.

DL Embodiment 1—SPS Transmission with DCI Activation with Single TCI Field

As described above, SPS transmission utilizes a combination of configuration of a semi-persistent resource and DCI activation/deactivation to enable and disable the use of a configured resource. The DCI format used for activation includes a transmission configuration indication (TCI) field to indicate one or more TCI state to be used for the SPS transmission for respective TOs in the transmission period. In some embodiments, multiple TCI states can be concatenated into a single TCI field. The size of the TCI field can be determined by the number of TCI states activated by a MAC CE. For example, the size of the TCI field can be 3 bits, 2 bits, 1 bit, or 0 bits.

Prior to the DCI being received by the first UE, a "PDSCH-Config" information element (IE) is received by the first UE as part of the configuration information. The "PDSCH-Config" IE includes a list of possible TCI states which can be up to 64 TCI states that could be utilized for the SPS transmission. A MAC CE will activate up to 8 TCI states within the list of TCI states in the "PDSCH-Config" IE. Once the DCI for scheduling activation PDCCH validation has been received, the TCI field in the DCI for scheduling activation PDCCH validation is used to identify the TCI states to be used for each TO in the transmission period. The TCI states in the TCI field can be applied in order to the TOs. A first TCI state in the TCI field is applied for SPS transmission on a first TO. Subsequent TOs in the transmission period then utilize subsequent TCI states from the TCI field.

Figure 3:
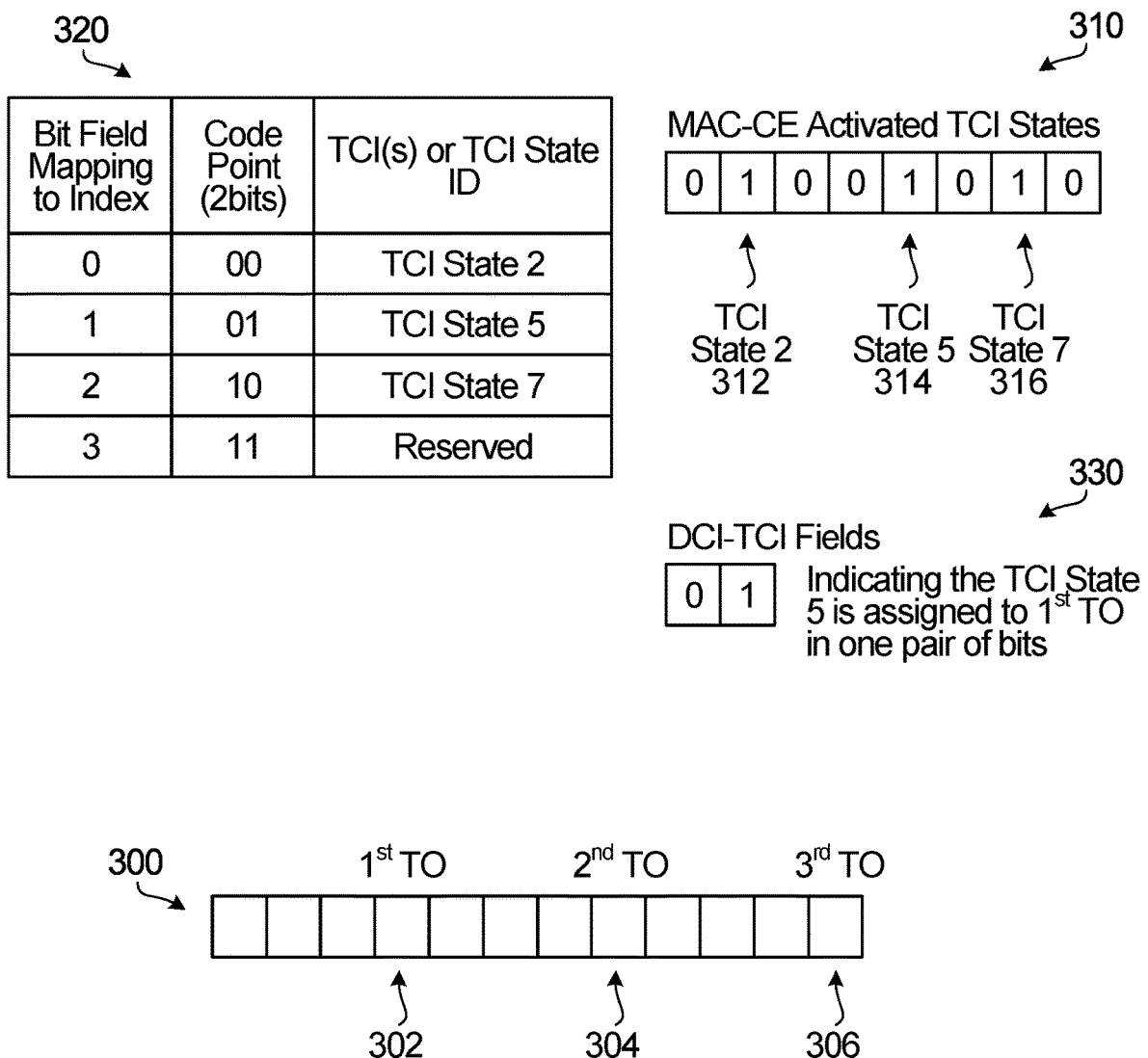
FIG. 3 illustrates a set of TCI states, particular ones of the set being indicated in a first example DCI and how the TCI states are used for transmission on a respective transmission opportunity according to an aspect of the present disclosure.

FIG. 3 illustrates an example of a DL transmission period 300 that is a time-frequency resource that includes twelve sub-transmission resources, three of which are configured as TOs 302, 304, 306 for SPS transmission. In a particular example, a media access control element (MAC CE) is represented by an eight bit bitmap 310. Each bit in the eight bit bitmap corresponds to a respective activated TCI state. For example, in FIG. 3, the second, fifth and seventh bits are "1", indicating that TCI State 2, TCI State 5 and TCI State 7 are being activated. The other bits are "0" indicating that they are not activated. Once the activated TCI states are identified, code points can be transmitted in the TCI field of the DCI to identify how the TCI states are associated with the TOs. The relationship between TCI states activated in the MAC CE and code points in the TCI field in the DCI is shown in table 320. The TCI state 2 312 in MAC CE is mapped to the first code point "00", the fifth TCI state 314 is mapped to the second code point "01", and the seventh TCI state 316 is mapped to the third code point "10".

In a particular example, as illustrated in FIG. 3, only code point "01" is indicated in the TCI field (i.e., TCI State 5 in table 320) in the DCI and therefore the TCI State 5 is associated with the first TO (or repetition) 302. By applying the order of the TCI states as shown in the table 350, the TCI State 7 is associated with the second TO (or repetition) 304. Because the TCI State 7 is last in the table 320, but not all the TCI states have been used, the TCI State 2 (the first entry in the table 320) is associated with the third TO (or repetition) 306. In this manner, only a single TCI state needs to be identified in the TCI field of the DCI to identify one of the activated TCI states and the UE then knows to cycle through the other TCI states, in a particular order, until all TOs are assigned a respective TCI state.

In another particular example, the number of bits for the TCI field in the DCI for scheduling activation PDCCH validation is 3 bits, as shown in Table 1, which simply reuses the 3 bit design accepted in R15/R16.

TABLE 1

| Transmission configuration indication when M = 3 TCI states are activated by MAC CE | | |
|---|---|---|
| Bit field mapped to index | Code point (2 bits) | TCI(s) or TCI stateId |
| 0 | 000 | TCI State 2 |
| 1 | 001 | TCI State 5 |
| 2 | 010 | TCI State 7 |
| 3 | 011 | Reserved |

TABLE 1-continued

| Transmission configuration indication when M = 3 TCI states are activated by MAC CE | | |
|---|---|---|
| Bit field mapped to index | Code point (2 bits) | TCI(s) or TCI stateId |
| 4 | 100 | Reserved |
| 5 | 101 | Reserved |
| 6 | 110 | Reserved |
| 7 | 111 | Reserved |

If the number of TCI states activated by the MAC CE is less than a number of TOs within a transmission period, then after the activated TCI states are allocated to a first corresponding number of configured TOs, the same TCI states can be repeated, in the same order, in the remaining TOs until all of the TOs have a corresponding TCI state. For example, a fourth TO in the previous example would be associated with the fifth TCI state (labeled as 314) again in a circular way. If the number of TCI states activated by the MAC CE is more than the number of TOs within a transmission period, the activated TCI states are applied in the order provided in the TCI field until teach of the TOs have an assigned TCI state. In such a situation, not all of the TCI states are allocated to a TO in that transmission period.

DL Embodiment 2—SPS Transmission with DCI Activation with Multiple TCI Fields

Another embodiment for implementing SPS transmission with DCI activation is utilizing multiple separate TCI fields. The TCI state in each TCI field is utilized in a one-to one mapping to a TO in the transmission period. The UE performs a one-to-one mapping from the indicated TCI state in each TCI field to one or more demodulation reference signal (DM-RS) port and the DM-RS ports corresponding PDSCH transmission. The size of each of the TCI fields, i.e. the number of bits in each TCI field, limits the total number of different TCI states. For example, if the TCI field includes 3 binary bits, there are a maximum of eight possible TCI states, each represented as a respective code point. If all eight code points are not utilized as TCI states, unused code points may be reserved for alternative purposes. The overall size of the TCI fields is simply the number of bits in each TCI field added together. In some embodiments, the TCI field is a fixed number of bits for each TCI field multiplied by the total number of TCI fields.

In some embodiments, in order to keep DCI overhead minimized, each TCI field has a maximum number of bits and there are a maximum number of TCI fields. In some embodiments, the maximum number of bits in each TCI field is three, allowing for eight possible TCI states. In some embodiments, the number of TCI fields may be limited to two or four fields.

Figure 4:
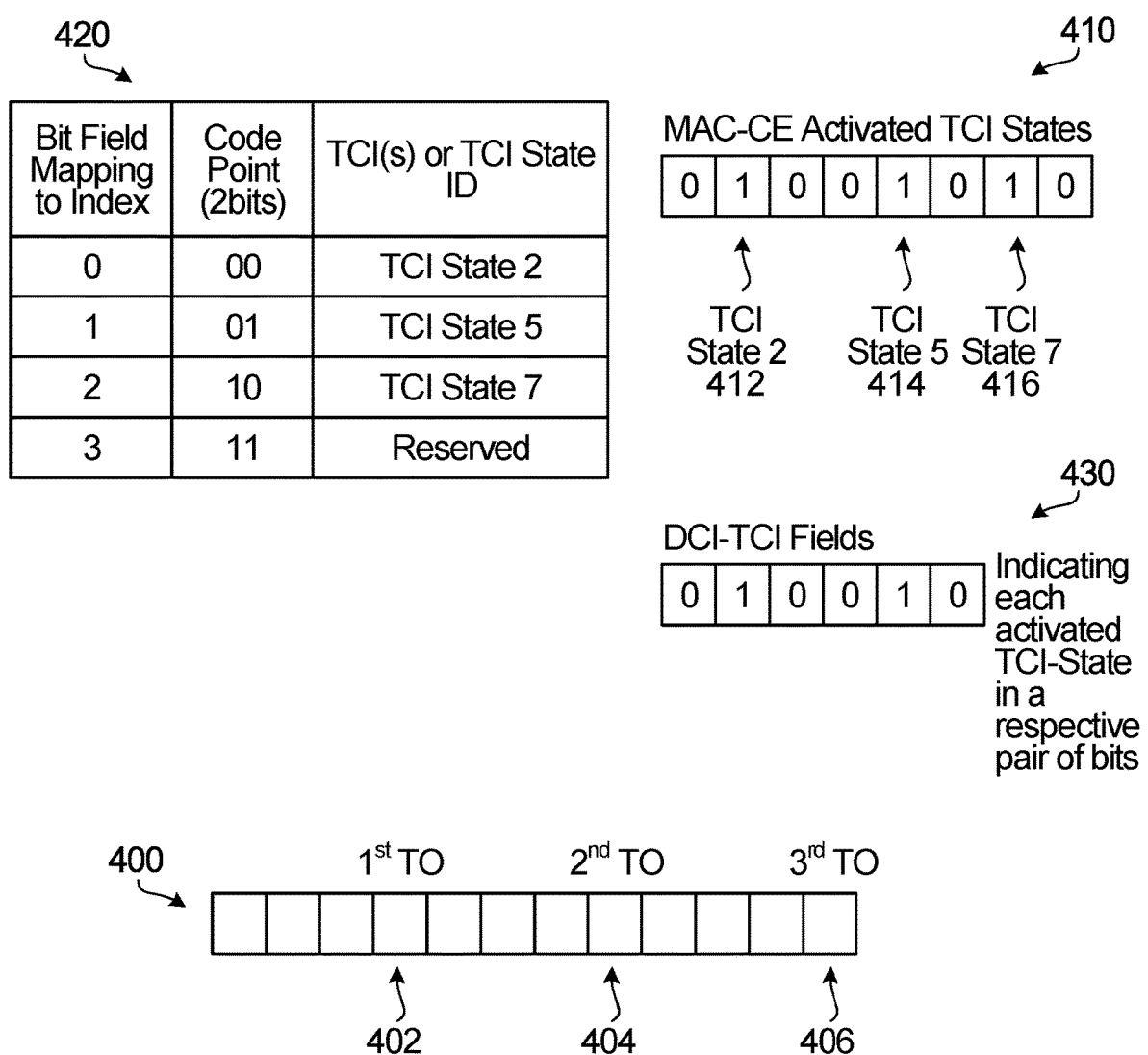
FIG. 4 illustrates a set of TCI states, particular ones of the set being indicated in a second example DCI and how the TCI states are used for transmission on a respective transmission opportunity according to an aspect of the present disclosure.

FIG. 4 illustrates an example of a DL transmission period 400 that is a time-frequency resource that includes twelve sub-transmission resources, three of which are configured as TOs 402, 404, 406 for SPS transmission. In a particular example, a MAC CE is represented by an eight bit bitmap 410. Each bit in the eight bit bitmap corresponds to a respective activated TCI state. For example, in FIG. 4, the second, fifth and seventh bits are "1", indicating that TCI State 2, TCI State 5 and TCI State 7 are being activated. The other bits are "0" indicating that they are not activated. Once the activated TCI states are identified, code points can be transmitted in the TCI field of the DCI to identify how the TCI states are associated with the TOs. The relationship between TCI states activated in the MAC CE and code points in the TCI field in the DCI is shown above in table 420.

In a particular example, as illustrated in FIG. 4, the three code points are transmitted in the DCI. A first code point "00" is indicated in the TCI field (i.e., TCI State 2 in Table 1) in the DCI and therefore the TCI State 2 is associated with the first TO (or repetition) 402. A second code point "10" is indicated in the TCI field (i.e., TCI State 7 in Table 1) in the DCI and therefore the TCI State 7 is associated with the second TO (or repetition) 404. A third code point "01" is indicated in the TCI field (i.e., TCI State 5 in Table 1) in the DCI and therefore the TCI State 5 is associated with the third TO (or repetition) 406.

By applying the order of the TCI states as shown in the table 420, the TCI State 7 follows TCI state is associated with the second TO (or repetition) 404. As the TCI State 7 is last in the table 420, but not all the TCI states have been used, the TCI State 2 is associated with the third TO (or repetition) 406. In this manner only a single TCI state needs to be identified in the TCI field of the DCI to identify one of the possible TCI states and the UE then knows to cycle through the other TCI states, in a particular order, until all TOs are assigned a respective TCI state.

If the number of TCI fields is less than the number of TOs configured by the base station, or the other UE, then the TCI fields can be circularly applied to other TOs as described above. For example, if there are two TCI fields in DCI for scheduling activation PDCCH validation, and the number of TOs in a transmission period is four, the first TCI field is used for the first TO, the second TCI field is used for the second TO, the first TCI field is used for the third TO, and the second TCI field is used for the fourth TO. If the number of TCI fields is more than the number of TOs within a periodicity, the TCI states can be applied to the TOs or repetitions in the order they are configured, as described above.

FIGS. 3 and 4 are merely two example representations of possible MAC-CE and DCI TCI fields based on a particular set of values. With different values, the length of the MAC-CE bitmap, the size of the individual DCI-TCI fields, the overall length of the TCI field, the number of activated TCIs, etc., can all vary and still be within the scope of the present disclosure.

DL Embodiment 3—SPS Transmission with DCI Activation with TCI Field Indicating One or More TCI States Another embodiment for implementing SPS transmission with DCI activation involves the DCI activation including a TCI field is an index associated with one or more TCI states.

FIG. 5A includes a table where an index is associated with one of two TCI states, or a combination of the two TCI states. In FIG. 5A, index 0 indicates use of a first TCI state '0', index 1 indicates use of a second TCI state '1', index 2 indicates use of both first and second TCI states '0,1' and index 3 is reserved for an alternative use. In the case of index 2 in which two TCI states are indicated, the two TCI states can be applied to the first and second TOs, respectively, in a transmission period. If there are more TOs in the transmission period that TCI states associated with the TCI index, the TCI states can be repeatedly applied in a circular way.

FIG. 5B includes a table where an index is associated with one of three TCI states, or various combinations of the three TCI states. In FIG. 5B, index 0 indicates use of a first TCI state '0', index 1 indicates use of a second TCI state '1', index 2 indicates use of a third TCI state '2', index 3 indicates use of both first and second TCI states '0,1', index 4 indicates use of both first and third TCI states '0,2', index 5 indicates use of both second and third TCI states '1,2', index 6 indicates use of all three TCI states '0,1,2' and index 7 is reserved for an alternative use. When more than one TCI state is associated with the index value, the TCI states are applied to respective TOs in a transmission period in the order of the TCI states. If there are more TOs in the transmission period than TCI states associated with the index, the TCI states can be repeatedly applied.

FIG. 5C includes a table where an index is associated with one of four TCI states, or various combinations of the four TCI states. In FIG. 5C, index 0 indicates use of a first TCI state '0', index 1 indicates use of a second TCI state '1', index 2 indicates use of a third TCI state '2', index 3 indicates use of a fourth TCI state '3', index 4 indicates use of both first and second TCI states '0,1', index 5 indicates use of both first and third TCI states '0,2', index 6 indicates use of both second and third TCI states '1,2', index 7 indicates use of first, second and third TCI states '0,1,2', and index 8 is reserved for an alternative use. When more than one TCI state is associated with the index value, the TCI states are applied to respective TOs in a transmission period in the order of the number of TCI states. For example, in the case of FIG. 5C, if the TCI index 7, which may have a binary bit representation of '0111', is indicated in the DCI, then the first, second and third TCI states will be used for the first TO, second TO, and third TO, respectively.

If there are more TOs in the transmission period than TCI states associated with the index, the TCI states can be repeatedly applied in a circular way. If there are less TOs in the transmission period than TCI states associated with the index, the TCI states are applied in order and some TCI states may not be utilized as there is no available TO.

The tables in FIGS. 5A, 5B and 5C are merely examples of relationships associating indices to TCI states and it is to be understood that different associations than those could be implemented.

DL Embodiment 4—SPS Transmission without DCI Activation

Another embodiment for SPS transmissions uses a configuration process similar to that described above in which the base station or a second UE notifies the first UE which TCI states are to be used, but does not have DCI activation. The "PDSCH-Config" IE used for configuration provides a list of TCI states to the UE. The UE performs one-to-one mappings of the configured TCI states to corresponding TOs. The TCI states may be identified by a TCI state identifier (ID). In a particular example, TCI-State IDs are mapped to TOs in an order provided in the "PDSCH-Config"IE, For example, a first TCI-State ID is associated with a first TO, a second TCI-State ID is associated with a second TO, and so on.

If the number of TCI-State IDs in the "PDSCH-Config" IE is less than a number of TOs within a transmission period, then after the configured TCI-State IDs are allocated to a first corresponding number of configured TOs, the same TCI-State IDs can be repeated, in the same order, in the remaining TOs, until all of the TOs have a corresponding TCI state. If the number of TCI-State IDs in the "PDSCH-Config" IE is more than the number of TOs within a transmission period, the TCI-State IDs are applied in the order provided in the "PDSCH-Config" IE until each of the TOs has an assigned TCI state. In such a situation, not all of the TCI states are allocated to a TO in that transmission period.

For Uplink (UL) Transmission

For an UL direction CG or SPS transmission, that is transmissions sent to a base station by a first UE on a CG resource or a SPS resource, the UE receives configuration information from the base station. Alternatively, this method can be used for sidelink communication, in which case the first UE transmits configuration information to a second UE. The configuration information includes more than one transmission beam parameter for configuring the first UE transmission, for example SRS resource indicators (SRIs), precoders, beams, QCL assumptions or TCI states. The transmission parameters are associated with different TOs in a transmission period.

Once the UE is configured, the UE transmits a transmission on a physical uplink shared channel (PUSCH) on the TO using the associated SRIs, precoders, beams, QCL assumptions or TCI states according to the configuration information received from the base station or the second UE.

UL Embodiment 1: Type 1 and Type 2 Configured Grant

The "ConfiguredGrantConfig" IE is used to configure uplink transmission without dynamic grant for either of two possible schemes, Type 1 and Type 2, which were described above. The uplink grant may be configured by sending configuration information via radio resource control (RRC) (Type1) or sending configuration information via the PDCCH, for example using a configured scheduling radio network tempory identifier (CS-RNTI) (Type2). A current version of the "ConfiguredGrantConfig" IE in R15 only allows a single SRI to be identified. In embodiments of the present disclosure as described above, multiple SRI may be used to provide diversity to mitigate a beam blocking scenario. In order to utilize multiple SRIs, multiple SRIs need to be identified. Therefore, some embodiments of the disclosure provide a modified version of the "ConfiguredGrantConfig" IE to enable multiple SRIs to be identified to the UE.

The "ConfiguredGrantConfig" IE includes a sequence of "srs-ResourceIndicator" fields or multiple "srs-ResourceIndicator" values. Each "srs-ResourceIndicator" field or value from a sequence of "srs-ResourceIndicator" fields or values indicates at least one SRI value. At least one SRI value may be determined as shown in FIGS. 6A-6L.

Below is an example of contents of a "ConfiguredGrantConfig" I E in which the "srs-ResourceIndicator" field is shown to include a definition for a size or a number of "srs-ResourceIndicator" fields, and potential values for those fields.

ConfiguredGrantConfig Information Element

```
--ASN1START
--TAG-CONFIGUREDGRANTCONFIG-START
ConfiguredGrantConfig ::=      SEQUENCE {
    ...
    repK                       ENUMERATED {n1, n2, n4, n8},
    repK-RV                    ENUMERATED {s1-0231, s2-0303,
                                 s3-0000}
OPTIONAL, --Need R
    rrc-ConfiguredUplinkGrant  SEQUENCE {
        timeDomainOffset       INTEGER (0..5119),
        timeDomainAllocation   INTEGER (0..15),
        frequencyDomainAllocation BIT STRING (SIZE(18)),
        antennaPort            INTEGER (0..31),
        dmrs-SeqInitialization INTEGER (0..1)
OPTIONAL, --Need R
        precodingAndNumberOfLayers INTEGER (0..63),
        srs-ResourceIndicator  SEQUENCE OF (SIZE (1..4) of
                                 INTEGER (0..15) )
OPTIONAL, --Need R
    ...
}
```

--TAG-CONFIGUREDGRANTCONFIG-STOP
--ASN1STOP

FIGS. 6A, 6B and 6C are limited to a maximum of a single SRI being associated with the index value.

FIG. 6A includes a table where an index value is associated with one of two SRI. In FIG. 6A, index 0 indicates use of a first SRI '0', and index 1 indicates use of a second SRI '1'. This could be implemented with a single binary bit.

FIG. 6B includes a table where an index value is associated with one of three SRI. In FIG. 6B, index 0 indicates use of a first SRI '0', index 1 indicates use of a second SRI '1', index 2 indicate use of a third SRI '2' and index 3 is reserved for an alternative use. This could be implemented with a pair of binary bits.

FIG. 6C includes a table where an index value is associated with one of four SRI. In FIG. 6C, index 0 indicates use of a first SRI '0', index 1 indicates use of a second SRI '1', index 2 indicates use of a third SRI '2' and index 3 indicates use of a fourth SRI '3'. This could be implemented with a pair of binary bits.

FIGS. 6D, 6E and 6F are limited to a maximum of two SRIs being associated with the index value.

FIG. 6D includes a table where an index value is associated with one of two SRI or a combination of the two SRI. In FIG. 6D, index 0 indicates use of a first SRI '0', index 1 indicates use of a second SRI '1', index 2 indicates use of both first and second SRI '0,1' and index 3 is reserved for an alternative use. In the case of index 2, represent by binary bits '10', in which two SRI are indicated, the two SRI can be applied to first and second TOs in a transmission period. If there are more TOs in the transmission period that SRI associated with the SRI index, the SRI states can be repeatedly applied. This could be implemented with a pair of binary bits.

FIG. 6E includes a table where an index value is associated with one of three SRI or various combinations of the three SRI. In FIG. 6E, index 0 indicates use of a first SRI '0', index 1 indicates use of a second SRI '1', index 2 indicates use of a third SRI '2', index 3 indicates use of both first and second SRI '0,1', index 4 indicates use of both first and third SRI '0,2', index 5 indicates use of both second and third SRI '1,2', indices 6 and 7 are reserved for an alternative use. When more than one SRI is associated with the index value, the SRI are applied to respective TOs in a transmission period in the order of the number of SRI. If there are more TOs in the transmission period than SRI associated with the index, the SRIs can be repeatedly applied. This could be implemented with a set of three binary bits.

FIG. 6F includes a table where an index value is associated with one of four SRI or various combinations of the four SRI. In FIG. 6F, index 0 indicates use of a first SRI '0', index 1 indicates use of a second SRI '1', index 2 indicates use of a third SRI '2', index 3 indicates use of a fourth SRI '3', index 4 indicates use of both first and second SRI '0,1', index 5 indicates use of both first and third SRI '0,2', index 6 indicates use of both first and fourth SRI '0,3', index 7 indicates use of both second and third SRI '1,2', index 8 indicates use of both second and fourth SRI '1,3', index 9 indicates use of both third and fourth SRI '2,3', and indices 10 to 15 are reserved for an alternative uses. This could be implemented with a set of four binary bits.

FIGS. 6G, 6H and 6I are further examples of indices associated with SRI values. In these examples, the SRI value is limited to a maximum of three SRI being associated with the index value.

FIGS. 6J, 6K and 6L are further examples of indices associated with SRI values. In these examples, the SRI value is limited to a maximum of four SRI being associated with the index value.

The UE transmits a CG transmission on PUSCH on the TO using the associated SRI value with a one-to-one mapping, i.e. one SRI is mapped to one TO according to a SRI index indicated by " srs-ResourceIndicator", which may be a single SRI or multiple SRIs as shown in the table of FIGS. 6A to 6L.

The UE performs a one-to-one mapping from the indicated sequence of SRI values in the table of FIGS. 6A to 6L to PUSCH layers {0 . . . v-1} corresponding to the DM-RS port(s) given by DCI format 0_1 or by the configuredGrant-Config IE.

UL Embodiment 2

Another embodiment for configured grant transmissions involves using a configuration process in which a "ConfiguredGrantConfig" IE includes a single "srs-ResourceIndicator" field for both configured Type 1 and Type 2. The single "srs-ResourceIndicator" indicates one SRI index. The SRI index can indicate a sequence of SRI values, for example, SRI 0, SRI 1, SRI 2

The UE can perform a one-to-one mapping from the SRI values to the indicated DM-RS port(s) and subsequent PUSCH repetitions. For example, SRI 0 is associated with the first PUSCH repetition, SRI 1 is associated with the second PUSCH repetition, SRI 2 is associated with the third PUSCH repetition, SRI 0 is associated with the fourth PUSCH repetition. All the PUSCH layers {0 . . . v-1} given by DCI format 0_1 or by "ConfiguredGrantConfig" for each repetition use the same SRI value.

This embodiment may reuse existing design of SRI indication in DCI and thereby reduce the necessity of revising existing methodologies. This embodiment may also keep a same bitwidth of SRI indication in DCI, by using a single "srs-ResourceIndicator" field for both configured Type 1 and Type 2, which may save overhead.

If the number of SRIs is less than a number of TOs within a transmission period, then after the SRI(s) indicated by the SRI indicator (also referred to as SRI index, for example in the table of FIG. 6A-6J) in the "srs-ResourceIndicator" field is/are allocated to a first corresponding number of configured TOs, the same SRIs can be repeated in circular manner, in the same order, in the remaining TOs, until all of the TOs have a corresponding SRI. If the number of SRIs is more than the number of TOs within a transmission period, the SRIs are applied in the order indicated in the "srs-ResourceIndicator" field until each of the TOs has an assigned SRI. In such a situation, not all of the SRI are allocated to a TO in that transmission period.

DL Embodiment 3

Another embodiment for implementing configured grant transmission involves utilizing multiple separate SRI fields in the activation DCI, for which each separate SRI field corresponds to a respective single SRI. The SRI in each SRI field is utilized in a one-to-one mapping to a TO in the transmission period. The UE performs a one-to-one mapping from the activated SRI to one or more demodulation reference signal (DM-RS) ports and the DM-RS ports corresponding PUSCH transmission.

The UE can perform one-to-one mapping from the indicated SRI values to the indicated DM-RS ports and their corresponding PUSCH layers {0 . . . v-1} given by DCI format 0_1 or by "ConfiguredGrantConfig" IE.

Furthermore, in order to minimize DCI overhead, each SRI field can be limited in size and the number of SRI fields can be limited to a desired number. In some embodiments, the maximum number of bits in each SRI field is two, allowing for four possible SRI for binary bits. In some embodiments, the number of SRI fields may be limited to two or four fields. If the number of SRI fields is less than the number of TOs configured by the base station, or the other UE, then the SRI fields can be repeatedly applied to other TOs as described above. If the number of TCI fields is more than the number of TOs within a periodicity, the SRIs can be applied to the TOs or repetitions in the order they are configured, as described above.

Embodiments for Robust Beam Association between DL RS and UL RS

The following four embodiments describe details involved in implementing robust beam association between DL reference signals (DL RS) and UL reference signals (UL RS) from the Network side (Network behavior) and the UE side (UE behavior).

Embodiment 1—Multiple Separate Higher Layer Parameters

Network Behavior

In this first embodiment, the base station sends a higher-layer parameter "ConfiguredGrantConfig" IE as described above in order to configure the UE. This parameter includes a list of more than one higher-layer parameter. In some embodiments, the list of higher layer parameters may be sent by the base station as a list of "rrc-ConfiguredUplinkGrant" fields. Each "rrc-ConfiguredUplinkGrant" field carries a single SRI corresponding to a SRS in a SRS resource set. In some embodiments, each SRS resource is configured with a corresponding "srs-SpatialRelationInfo" object to establish a particular UE transmit beam that the UE is to use based on the UE receive beam that the UE used to detect a downlink reference signal (DL RS). Examples of DL RS include, but are not limited to, synchronization signals/physical broadcast (SS/PBCH) block or channel state information reference signal (CSI-RS).

Upon reception of the SRS at the base station that is transmitted by the UE, the network can determine transmit beams to be subsequently used by the network side transmitter to provide an improved transmission experience to the UE in order to meet URLLC requirements.

UE Behavior

Upon receiving the list of higher layer parameters i.e. the list of "rrc-ConfiguredUplinkGrant" fields, the UE transmits all of the SRSs signaled in the list of "rrc-ConfiguredUplinkGrant"fields. Each SRS is transmitted at a respective TO in a given transmission period. For example, each SRS may be transmitted on a separate OFDM symbol, using a separate UE transmit beam. The UE transmit beam can be determined based on spatial relationships established in accordance with DL RS that the UE was able to detect using UE receive beams.

Figure 7:
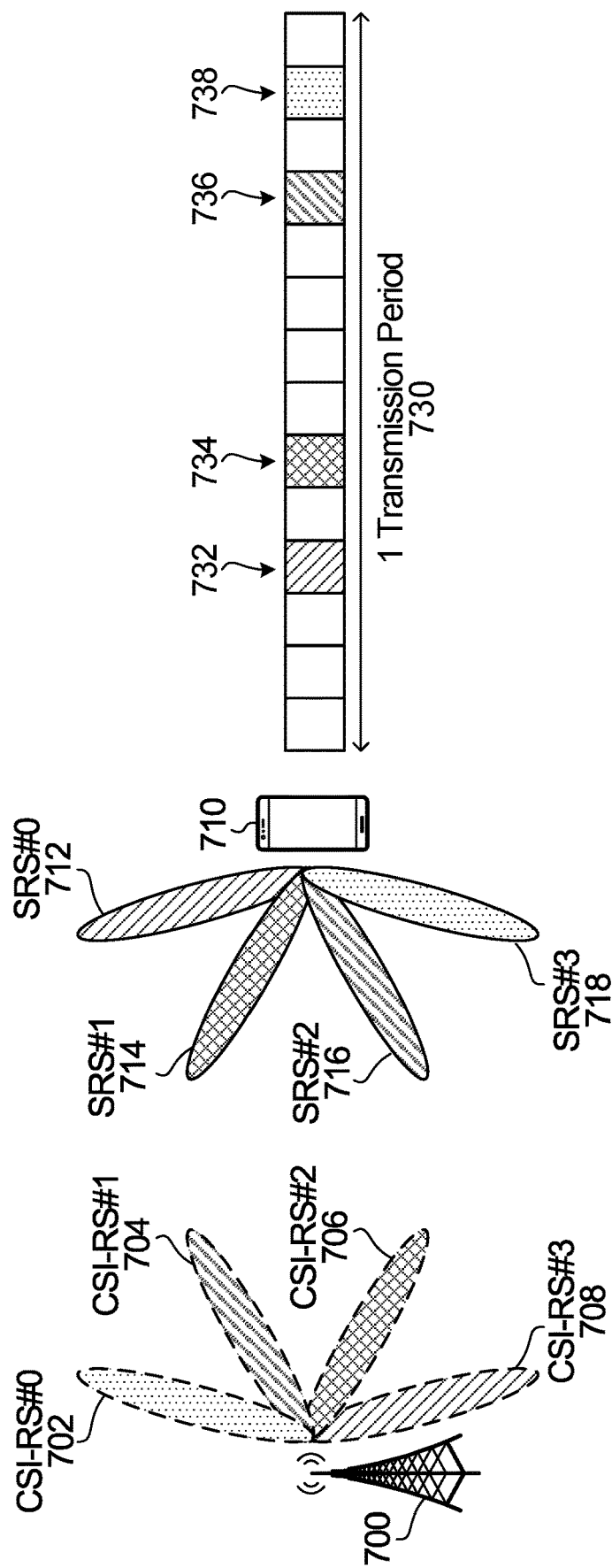
FIG. 7 is a schematic diagram showing an example of beams transmitting DL RS from a base station and SRS being transmitted from a UE on corresponding beams at different symbols of a transmission period according to an embodiment of the present disclosure.

FIG. 7 illustrates a base station 700 and a UE 710. Four separate DL RS beams 702, 704, 706 and 708 are shown being transmitted by the base station 700. The DL RS beams are shown to be CSI-RS signals. However, it is to be understood that that the RS could be other types of RS. As described above, the DL RS transmitted by the base station 700 may be used by the UE 710 to determine UE 710 transmit beams to use and transmit the SRS. Therefore, there are four UE transmit beams 712, 714, 716 and 718 for transmitting a respective SRS. The cross hatching on the DL RS beams and the UE SRS beams illustrates a corresponding match between the base station beams and UE beams. Also in FIG. 7, a representation of a transmission period 730 is shown having 14 symbols. As described above, different TOs are used to transmit the various SRS that the UE 710 is to transmit. FIG. 7 shows the fourth symbol 732 is when SRS#0 is transmitted, the sixth symbol 734 is when SRS#1 is transmitted, the eleventh symbol 736 is when SRS#2 is transmitted and the thirteenth symbol 738 is when SRS#3 is transmitted.

Embodiment 2—Single Separate Higher Layer Parameter

Network Behavior

In this second embodiment, the base station sends a higher-layer parameter "ConfiguredGrantConfig" as described above to the UE. This parameter includes a higher-layer parameter. In some embodiments, the higher layer parameter may be sent by the base station in a "rrc-ConfiguredUplinkGrant" field. Each "rrc-ConfiguredUplinkGrant" field carries a list of SRIs corresponding to a given SRS in a SRS resource set. Each SRS resource is configured with a corresponding "srs-SpatialRelationInfo" object establishing a particular UE transmit beam that the UE is to use, The particular UE transmit beam may be based on the UE receive beam that the UE used to detect a DL RS. Upon reception of the SRS transmitted by the UE, the network can determine transmit beams to be used by the network side transmitter to provide a sufficient transmission experience to the UE in order to meet URLLC requirements.

UE Behavior

Upon receiving the higher layer parameter "rrc-ConfiguredUplinkGrant" field including the list of SRIs, the UE transmits all the SRSs signaled in the "rrc-ConfiguredUplinkGrant" object in one transmission period. For example, one or more SRSs can be transmitted on a given OFDM symbol, using a separate UE transmit beam. The UE transmit beam may be determined based on spatial relationships established in accordance with DLRS the UE was able to detect using UE receive beams.

Figure 8:
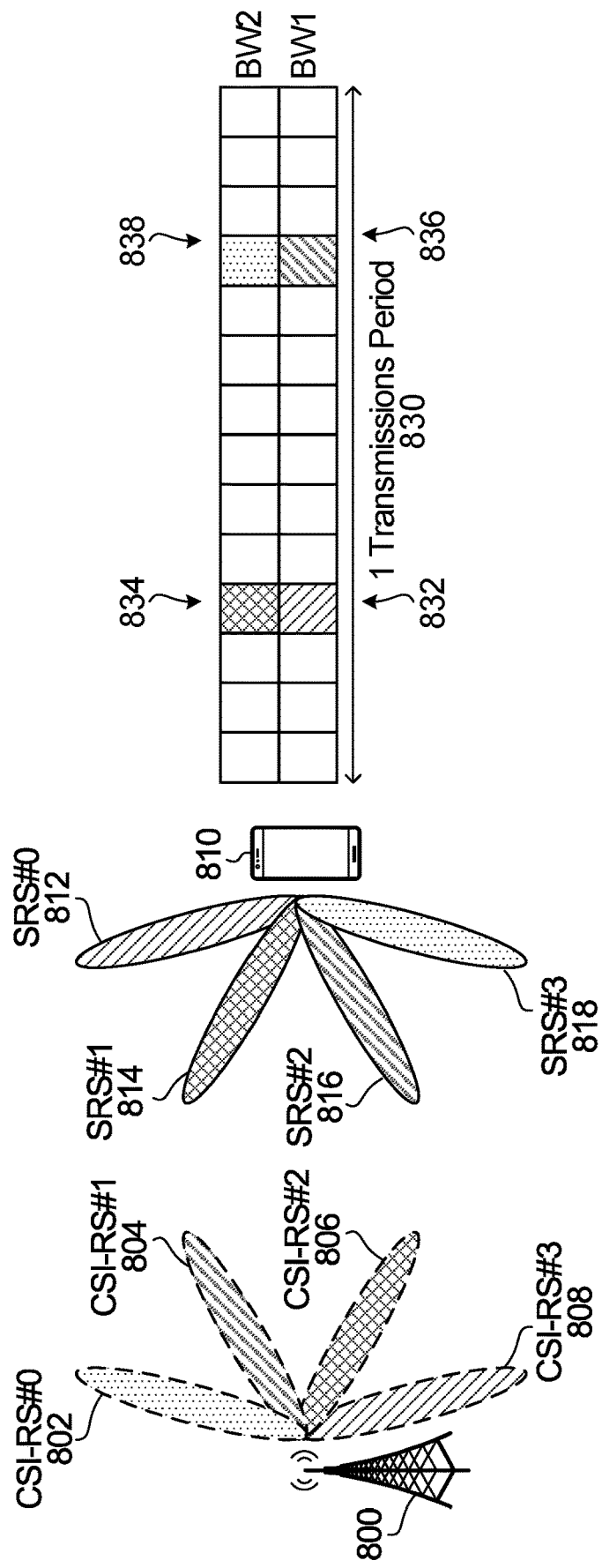
FIG. 8 is a schematic diagram showing an example of beams transmitting DL RS from a base station and more than one SRS being transmitted at the same symbol of a transmission period from a UE on corresponding beams according to an embodiment of the present disclosure.

FIG. 8 illustrates a base station 800 and a UE 810. Four separate DL RS beams 802, 804, 806 and 808 are shown being transmitted by the base station 800. The DL RS beams are shown to be CSI-RS signals. However, it is to be understood that that the RS could be other types of RS. As described above, the DL RS transmitted by the base station 800 may be used by the UE 810 to determine UE transmit beams to use and transmit the SRS. Therefore, there are four UE transmit beams 812, 814, 816 and 818 for transmitting a respective SRS. The cross hatching on the DL RS beams and the UE SRS beams illustrates a corresponding match between the base station beams and UE beams. Also in FIG. 8, a representation of a transmission period 830 is shown having two frequency bands (BW1, BW2) of 14 symbols. As described above, different TOs are used to transmit the various SRS that the UE 810 is to transmit. FIG. 8 shows the fourth symbol 832 of the first frequency band BW1 is when SRS#0 is transmitted, the fourth symbol 834 of the second frequency band BW2 is when SRS#1 is transmitted, the eleventh symbol 836 of the first frequency band BW1 is when SRS#2 is transmitted and the eleventh symbol 838 of the second frequency band BW2 is when SRS#3 is transmitted.

Embodiment 3

Network Behavior

In this third embodiment, the base station sends a higher-layer parameter "pdsch-Config" to the UE. This parameter includes a higher-layer parameter "tci-StatesToAddModList" which configures a list of QCL assumptions. Each QCL assumption relates to a specific DL RS (e.g. SS/PBCH block or CSI-RS). The network transmits a MAC-CE command activating multiple TCI states. The network transmits a PDCCH scheduling a PDSCH carrying a TCI field carrying one or more TCI code-points. The TCI code-points indicate which DL RSs the PDSCH is QCL-ed with. The network transmits the corresponding PDSCH transmission that is QCL-ed with multiple DL RSs over multiple network transmit beams. TCI code-point entries can form a TCI codebook. An example of a TCI codebook is shown in FIG. 9 with TCI codebook entries having four bits.

Upon reception of Beam Status Indications (BSIs) from the UE, the network can update the list of activated TCI states for that UE and use the set of beams that is most suitable for that UE in order to provide robust beam transmission so as to meet URLLC requirements.

UE Behavior

The UE receives a PDSCH transmission that is QCL-ed with multiple DL RS using corresponding UE receive beams that the UE detects the respective DL RS with. For each network transmit beam used for the PDSCH transmission, the UE reports back a Beam Status Indication (BSI). The BSI indicates a status of a network transmit beam for a given UE receive beam. The BSI status can be sent using a separate channel from the PUCCH or a new channel dedicated to the reporting of BSI. For a given UE receive beam, the BSI can correspond to $\{RSRP_{CSI-RS\#0}, RSRP_{CSI-RS\#1}, RSRP_{CSI-RS\#2}, RSRP_{CSI-RS\#3}\}$. The UE receive beam upon which the BSIs are conditioned can be indicated by indicating the UE receive beam corresponding to the DL RS it detected. The indication for each network transmit beam may be a 1 bit indication based on a threshold, a multiple bit indication carrying a quantized value, or some other indication.

Figure 10:
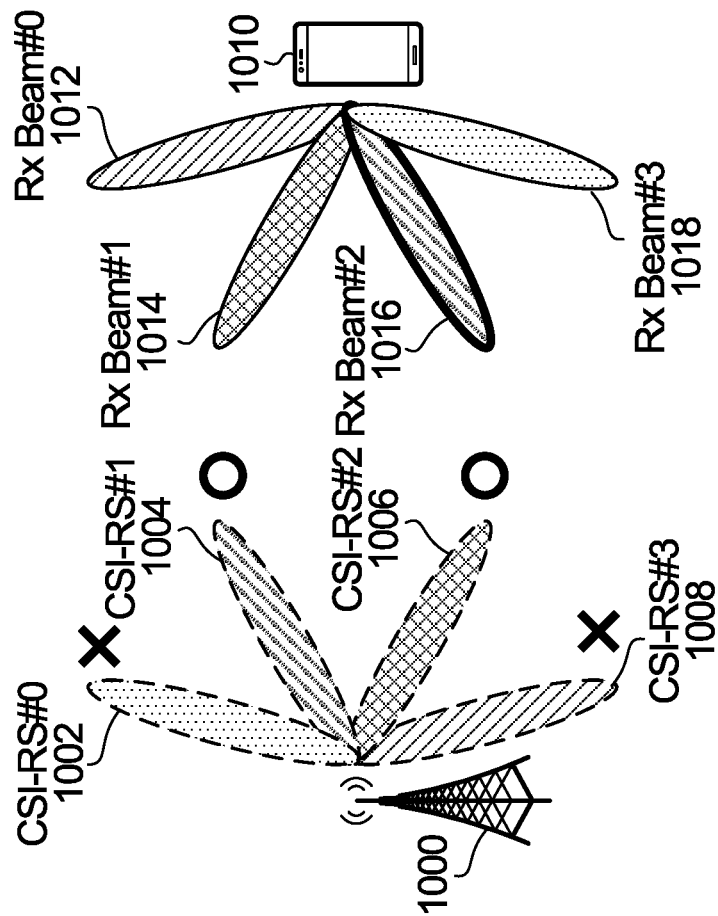
FIG. 10 is a schematic diagram showing an example of beams transmitting DL RS from a base station and receive beams at a UE being used to establish preferred transmission beams for subsequent transmissions by the base station to the UE according to an embodiment of the present disclosure.

FIG. 10 illustrates a base station 1000 and a UE 1010. Four separate DL RS beams 1002, 1004, 1006 and 1008 are shown being transmitted by the base station 1000. The DL RS beams are shown to be CSI-RS signals. However, it is to be understood that that the RS could be other types of RS. The UE receive beams 1012, 1014, 1016, 1018 are illustrated in FIG. 10. The cross hatching on the DL RS beams and the UE receive beams illustrates a corresponding match between the base station and UE beams. FIG. 10 additional indicates that receive beams 1014 and 1016 are indicated to provide the best BSI results and therefore the base station will transmit on the transmit beams that are shown to also transmit DL RS 1004 and 1006.

Embodiment 4

Network Behavior

In this embodiment, the base station sends a higher-layer parameter "pdsch-Config" to the UE. This parameter includes a higher-layer parameter "tci-StatesToAddModList" which configures a list of QCL assumptions. Each QCL assumption relates to a specific DL RS (e.g. SS/PBCH block or CSI-RS). The network transmits a MAC-CE command activating multiple TCI states. The network transmits a PDCCH scheduling a PDSCH carrying a TCI field carrying one or more TCI code-points. The TCI code-points indicate which DL RSs the PDSCH is QCL-ed with. The network transmits the corresponding PDSCH transmission that is QCL-ed with multiple DL RSs over multiple network transmit beams.

Upon reception of BSIs from the UE, the network can update the list of activated TCI states for that UE and use the set of beams that is most suitable for that UE in order to provide robust beam transmission so as to meet URLLC requirements.

UE Behavior

UE Behavior

The UE receives a PDSCH transmission that is QCL-ed with multiple DL RS using the corresponding UE receive beams that the UE detects the respective DL RS with. For each network transmit beam used for the PDSCH transmission, the UE reports back a BSI. The BSI indicates the status of the corresponding network transmit beam for a given UE receive beam. For a given UE receive beam, the BSI can correspond to $\{RSRP_{CSI-RS\#0}, RSRP_{CSI-RS\#1}, RSRP_{CSI-RS\#2}, RSRP_{CSI-RS\#3}\}$. The UE receive beam upon which the BSIs are conditioned can be indicated by indicating the UE receive beam corresponding to the DL RS it detected. The indication for each network transmit beam can be a 1 bit indication based on a threshold, a multiple bit indication carrying a quantized value or some other indication. The BSI is transmitted as part of Uplink Control Information (UCI) and transmitted by the UE over the PUCCH.

Figure 11:
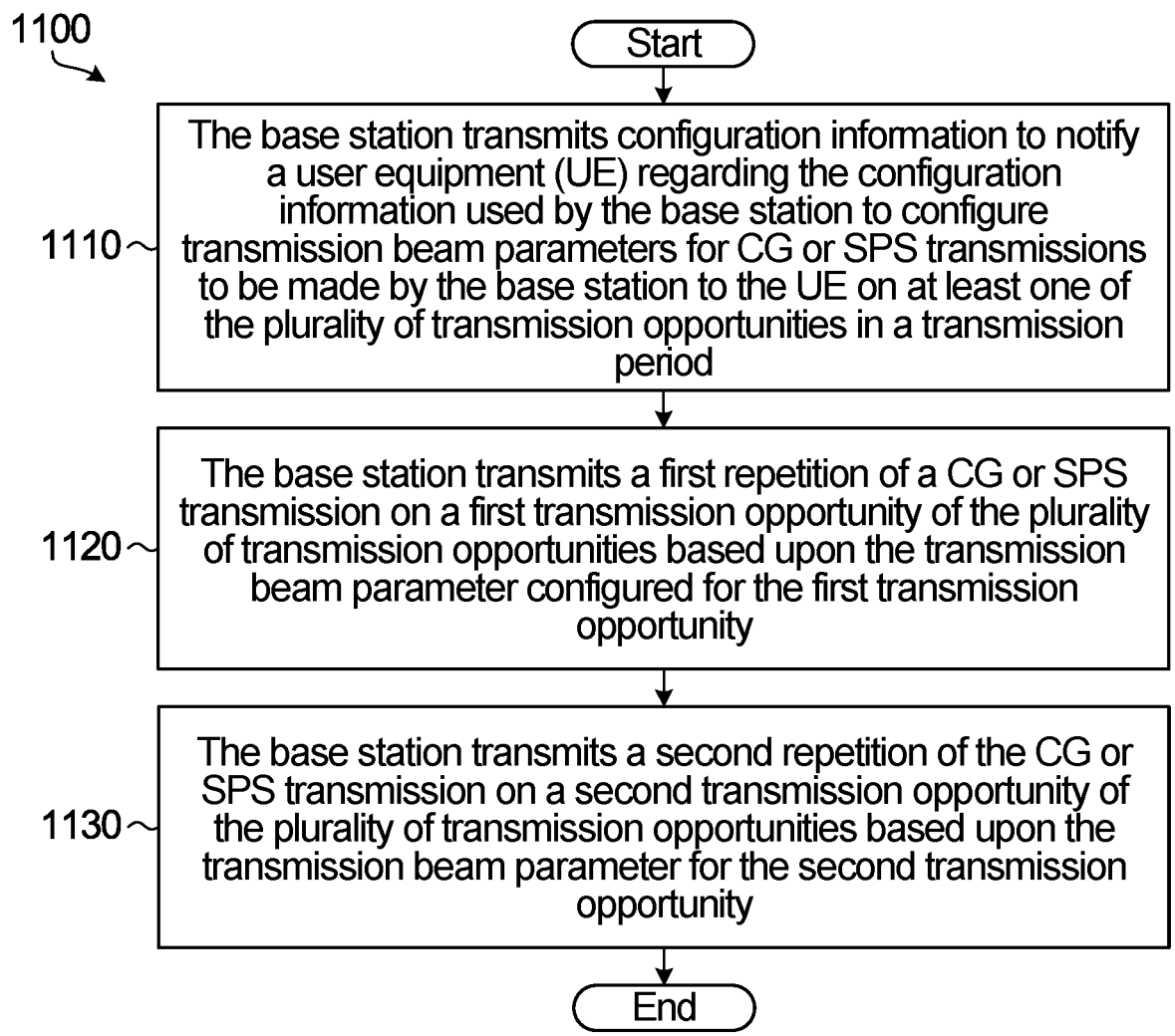
FIG. 11 is a flow chart illustrating a first example method performed by a base station according to an embodiment of the present disclosure.

FIG. 11 is an example flow diagram 1100 that describes a method for downlink transmission of configured grant or SPS transmissions from the perspective of a base station. At 1110, the base station transmits configuration information to notify a user equipment (UE) regarding the configuration information used by the base station to configure transmission beam parameters for CG or SPS transmissions to be made by the base station to the UE on at least one of the plurality of transmission opportunities in a transmission period.

At 1120, the base station transmits a first repetition of a CG or SPS transmission on a first transmission opportunity of the plurality of transmission opportunities based upon the transmission beam parameter configured for the first transmission opportunity.

At 1130, the base station transmits a second repetition of the CG or SPS transmission on a second transmission opportunity of the plurality of transmission opportunities based upon the transmission beam parameter for the second transmission opportunity.

Examples of transmission beam parameters referred above with reference to FIG. 11, and also with reference to FIGS. 12, 13 and 14 below, include one or more of: a transmission configuration indication (TCI) state; a sounding resource signal (SRS) resource indicator (SRI); a quasi-co-location (QCL) assumption; a precoder; and a beam index defining a transmission beam.

In some embodiments, as described above in further detail, the base station transmits configuration information for a single TCI state or SRI value for a first TO and additional TCI states or SRI values for additional TOs are configured based on a known pattern or rules. In some embodiments, the base station transmits configuration information for multiple TCI states or SRI values that each correspond to a respective TO.

Figure 12:
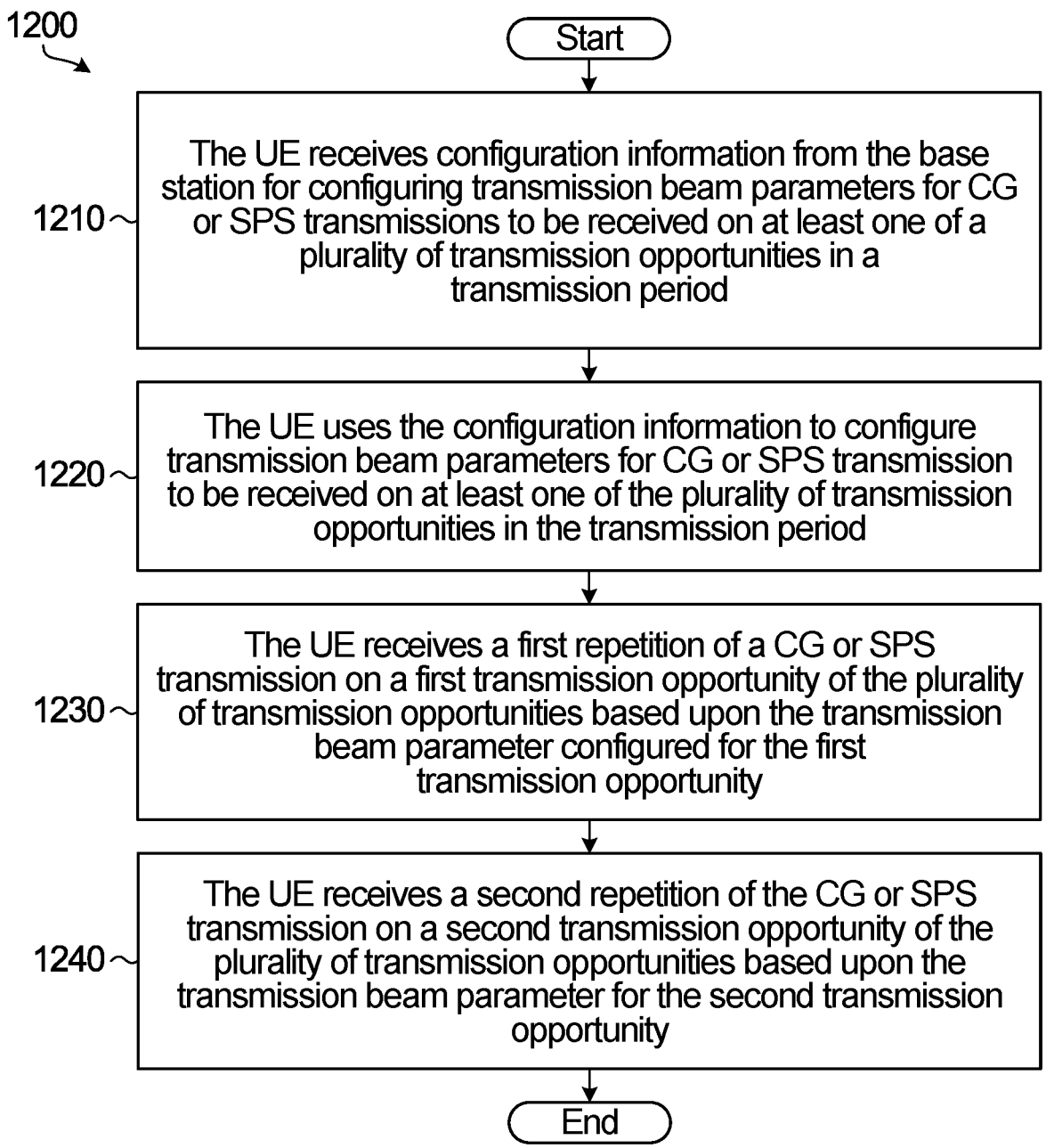
FIG. 12 is a flow chart illustrating a first example method performed by a UE according to an embodiment of the present disclosure.

FIG. 12 is an example flow diagram 1200 that describes a method for downlink transmission of configured grant or SPS transmissions from the perspective of a UE.

At 1210, the UE receives configuration information from the base station for configuring transmission beam parameters for CG or SPS transmissions to be received on at least one of a plurality of transmission opportunities in a transmission period.

At 1220, the UE uses the configuration information to configure transmission beam parameters for CG or SPS transmissions to be received on at least one of the plurality of transmission opportunities in the transmission period.

At 1230, the UE receives a first repetition of a CG or SPS transmission on a first transmission opportunity of the plurality of transmission opportunities based upon the transmission beam parameter configured for the first transmission opportunity.

At 1240, the UE receives a second repetition of the CG or SPS transmission on a second transmission opportunity of the plurality of transmission opportunities based upon the transmission beam parameter for the second transmission opportunity.

In some embodiments, as described above in further detail, the UE receives configuration information for a single TCI state or SRI value for a first TO and additional TCI states or SRI values for additional TOs are configured based on a known pattern or rules. In some embodiments, the UE receives configuration information for multiple TCI states or SRI values that each correspond to a respective TO.

Figure 13:
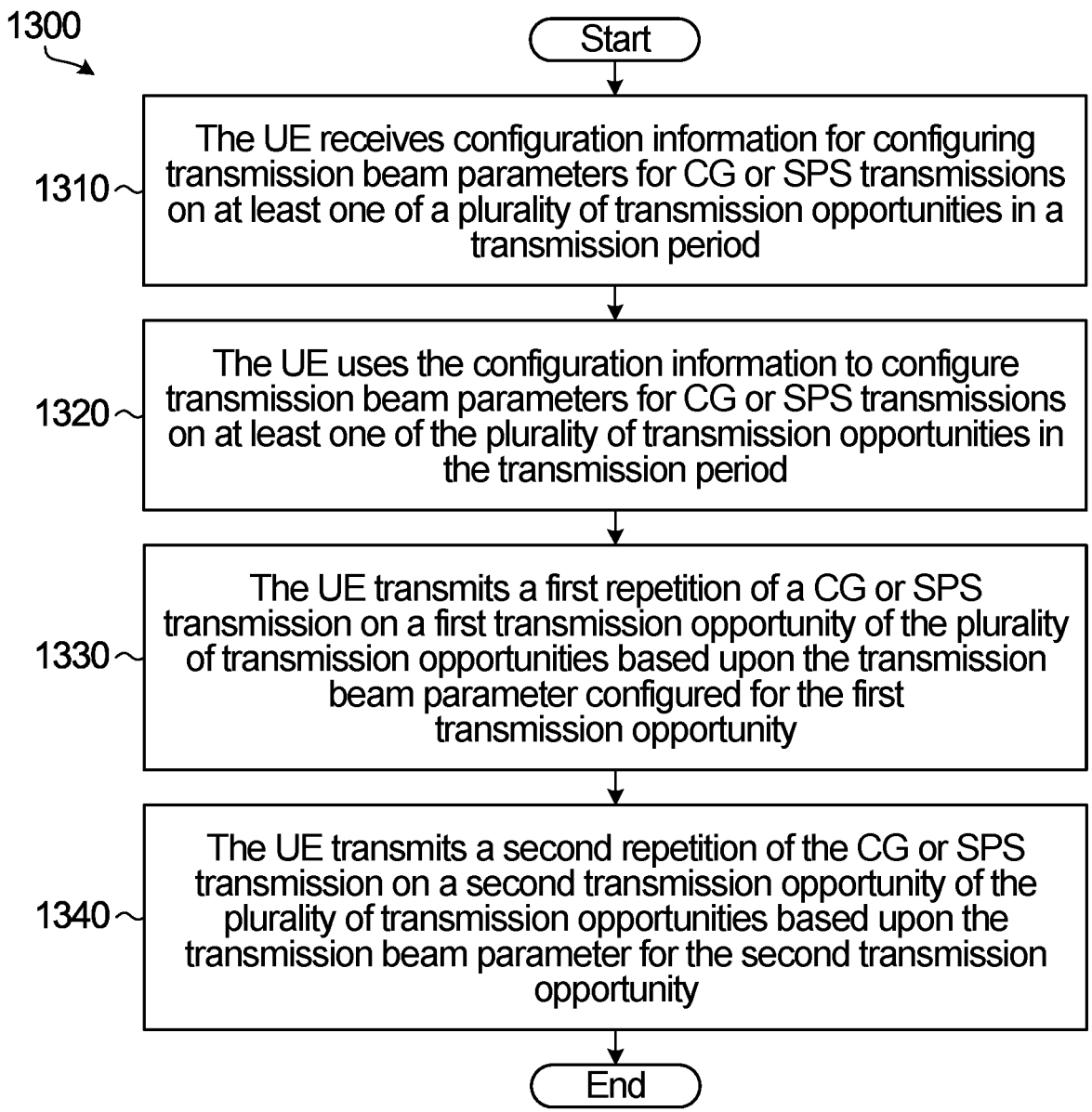
FIG. 13 is a flow chart illustrating a second example method performed by a UE according to an embodiment of the present disclosure.

FIG. 13 is an example flow diagram 1300 that describes a method for uplink transmission of configured grant or SPS transmissions from the perspective of a UE.

At 1310, the UE receives configuration information for configuring transmission beam parameters for CG or SPS transmissions on at least one of a plurality of transmission opportunities in a transmission period.

At 1320, the UE uses the configuration information to configure transmission beam parameters for CG or SPS transmissions on at least one of the plurality of transmission opportunities in the transmission period.

At 1330, the UE transmits a first repetition of a CG or SPS transmission on a first transmission opportunity of the plurality of transmission opportunities based upon the transmission beam parameter configured for the first transmission opportunity.

At 1340, the UE transmits a second repetition of the CG or SPS transmission on a second transmission opportunity of the plurality of transmission opportunities based upon the transmission beam parameter for the second transmission opportunity.

In some embodiments, as described above in further detail, the UE transmits configuration information for a single TCI state or SRI value for a first TO and additional TCI states or SRI values for additional TOs are configured based on a known pattern or rules. In some embodiments, the UE transmits configuration information for multiple TCI states or SRI values that each correspond to a respective TO.

Figure 14:
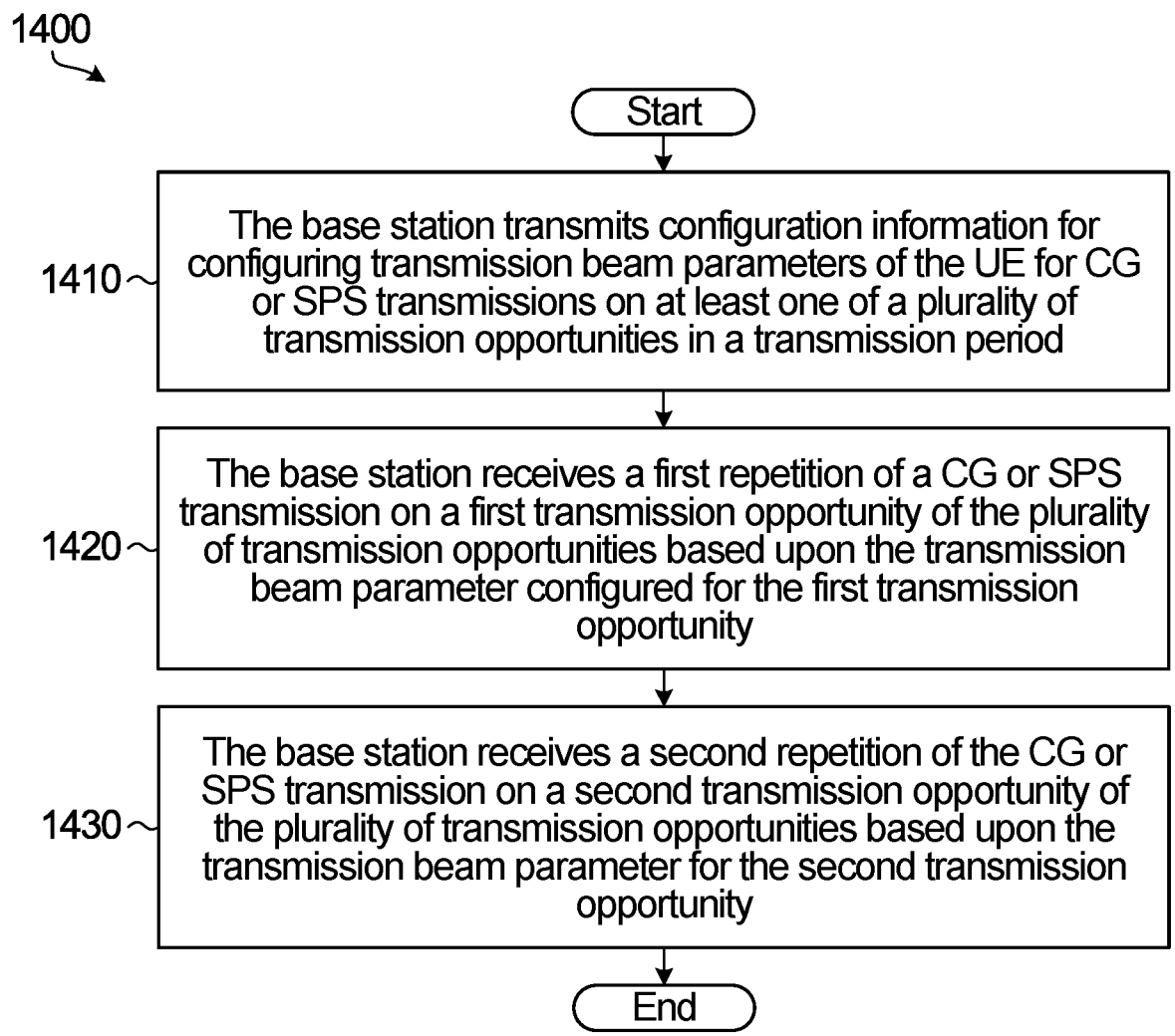
FIG. 14 is a flow chart illustrating a second example method performed by a base station according to an embodiment of the present disclosure.

FIG. 14 is an example flow diagram 1400 that describes a method for uplink transmission of configured grant or SPS transmissions from the perspective of a base station.

At 1410, the base station transmits configuration information for configuring transmission beam parameters of the UE for CG or SPS transmissions on at least one of a plurality of transmission opportunities in a transmission period.

At 1420, the base station receives a first repetition of a CG or SPS transmission on a first transmission opportunity of the plurality of transmission opportunities based upon the transmission beam parameter configured for the first transmission opportunity.

At 1430, the base station receives a second repetition of the CG or SPS transmission on a second transmission opportunity of the plurality of transmission opportunities based upon the transmission beam parameter for the second transmission opportunity.

In some embodiments, as described above in further detail, the base station receives configuration information for a single TCI state or SRI value for a first TO and additional TCI states or SRI values for additional TOs are configured based on a known pattern or rules. In some embodiments, the base station receives configuration information for multiple TCI states or SRI values that each correspond to a respective TO.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the figures or all of the portions schematically shown in the figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
    configuring a transmission beam parameter for configured grant (CG) or semi-persistent scheduling (SPS) transmissions on at least one of a plurality of transmission opportunities in a transmission period;
    transmitting a first repetition of a CG or SPS transmission on a first transmission opportunity of the plurality of transmission opportunities based upon the transmission beam parameter configured for the first transmission opportunity; and
    transmitting a second repetition of the CG or SPS transmission on a second transmission opportunity of the plurality of transmission opportunities based upon the transmission beam parameter for the second transmission opportunity.

2. The method of claim 1, wherein the transmission beam parameter is one or more of:
    a transmission configuration indication (TCI) state;
    a sounding resource signal (SRS) resource indicator (SRI);
    a quasi-co-location (QCL) assumption;
    a precoder; and
    a beam index defining a transmission beam.

3. The method of claim 1, wherein when a number of transmission beam parameters being configured is less than a number of transmission opportunities in a transmission period, applying the transmission beam parameters to transmission opportunities in an order based upon configuration information and then repeating the transmission beam parameters in a same order for the remaining transmission opportunities.

4. The method of claim 1, wherein when a number of transmission beam parameters being configured is more than a number of transmission opportunities in a transmission period, applying the transmission beam parameters to transmission opportunities in a same order based on configuration information for each of the transmission opportunities.

5. The method of claim 1, wherein the method is performed by a user equipment (UE), and wherein the configuring the transmission beam parameter comprises:
    the UE receiving configuration information for configuring transmission beam parameters for CG or SPS transmissions on at least one of the plurality of transmission opportunities in a transmission period.

6. The method of claim 5, wherein the configuration information comprises a single sounding resource signal (SRS) resource indicator (SRI) field including one or more SRIs, each SRI for a transmission opportunity in the transmission period.

7. The method of claim 5, wherein the configuration information comprises a plurality of sounding resource signal (SRS) resource indicator (SRI) fields, each SRI field comprising an SRI for a transmission opportunity in the transmission period.

8. The method of claim 5, wherein the configuration information comprises sounding resource signal (SRS) resource indicator (SRI) information defined by a field of bits, the value of the field of bits corresponding to an index associated with one selection of a set of possible SRI selections.

9. The method of claim 8, wherein at least one of the set of possible SRI selections comprises more than one SRI value, each SRI value being for a different layer of a configured grant transmission.

10. The method of claim 5, wherein the configuration information comprises an association of one or more demodulation reference signal (DMRS) ports per sounding resource signal (SRS) resource indicator (SRI).

11. An apparatus comprising:
    a processor; and
    a computer-readable medium having stored thereon computer-executable instructions, that when executed by the processor, cause the apparatus to:
        configure a transmission beam parameter for configured grant (CG) or semi-persistent scheduling (SPS) transmissions on at least one of a plurality of transmission opportunities in a transmission period;
        transmit a first repetition of a CG or SPS transmission on a first transmission opportunity of the plurality of transmission opportunities based upon the transmission beam parameter configured for the first transmission opportunity; and
        transmit a second repetition of the CG or SPS transmission on a second transmission opportunity of the plurality of transmission opportunities based upon the transmission beam parameter for the second transmission opportunity.

12. The apparatus of claim 11, wherein the transmission beam parameter is one or more of:
    a transmission configuration indication (TCI) state;
    a sounding resource signal (SRS) resource indicator (SRI);
    a quasi-co-location (QCL) assumption;
    a precoder; and
    a beam index defining a transmission beam.

13. The apparatus of claim 11, wherein when a number of transmission beam parameters being configured is less than a number of transmission opportunities in a transmission period, the apparatus applies the transmission beam parameters to transmission opportunities in an order based upon the configuration information and then repeating the transmission beam parameters in a same order for the remaining transmission opportunities.

14. The apparatus of claim 11, wherein when a number of transmission beam parameters being configured is more than a number of transmission opportunities in a transmission period, the apparatus applies the transmission beam parameters to transmission opportunities in a same order based on configuration information for each of the transmission opportunities.

15. The apparatus of claim 11, wherein the apparatus is a user equipment (UE), and wherein the computer-executable instructions, when executed by the processor, cause the UE to:
   receive configuration information for configuring transmission beam parameters for CG or SPS transmissions on at least one of the plurality of transmission opportunities in a transmission period.

16. The apparatus of claim 15, wherein the configuration information comprises a single sounding resource signal (SRS) resource indicator (SRI) field including one or more SRIs, each SRI for a transmission opportunity in the transmission period.

17. The apparatus of claim 15, wherein the configuration information comprises a plurality of sounding resource signal (SRS) resource indicator (SRI) fields, each SRI field comprising an SRI for a transmission opportunity in the transmission period.

18. The apparatus of claim 15, wherein the configuration information comprises sounding resource signal (SRS) resource indicator (SRI) information defined by a field of bits, the value of the field of bits corresponding to an index associated with one selection of a set of possible SRI selections.

19. The apparatus of claim 18, wherein at least one of the set of possible SRI selections comprises more than one SRI value, each SRI value being for a different layer of a configured grant transmission.

20. The apparatus of claim 15, wherein the configuration information comprises an association of one or more demodulation reference signal (DMRS) ports per sounding resource signal (SRS) resource indicator (SRI).

\* \* \* \* \*